US012810071B2

(12) United States Patent
Huth et al.

(10) Patent No.: US 12,810,071 B2
(45) Date of Patent: Nov. 24, 2026

(54) DECODING LANGUAGE FROM NON-INVASIVE BRAIN RECORDINGS

(71) Applicant: Board of Regents, The University of Texas System, Austin, TX (US)

(72) Inventors: Alexander Huth, Austin, TX (US); Jerry Tang, Round Rock, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 155 days.

(21) Appl. No.: 18/723,803

(22) PCT Filed: Feb. 22, 2023

(86) PCT No.: PCT/US2023/013618
§ 371 (c)(1),
(2) Date: Jun. 24, 2024

(87) PCT Pub. No.: WO2023/163991
PCT Pub. Date: Aug. 31, 2023

(65) Prior Publication Data

US 2025/0068841 A1 Feb. 27, 2025

Related U.S. Application Data

(60) Provisional application No. 63/312,801, filed on Feb. 22, 2022.

(51) Int. Cl.
*G06F 40/00* (2020.01)
*G06F 3/01* (2006.01)
(Continued)

(52) U.S. Cl.
CPC ............ *G06F 40/274* (2020.01); *G06F 3/015* (2013.01); *G06F 40/169* (2020.01); *G06F 40/30* (2020.01); *G10L 15/183* (2013.01)

(58) Field of Classification Search
CPC ...... G06F 40/30; G06F 40/268; G06F 40/253; G06F 40/211; G06F 40/284;
(Continued)

(56) References Cited

U.S. PATENT DOCUMENTS 10,795,440 B1 10/2020 Chevillet et al.
2017/0221486 A1 8/2017 Kurata et al.

FOREIGN PATENT DOCUMENTS

WO 2021/021714 A1 2/2021

OTHER PUBLICATIONS

Caucheteux et al., "Long-range and Hierarchical Language Predictions in Brains and Algorithms", Quantitative Biology Neurons and Cognition, Nov. 28, 2021, 10 pages.
(Continued)

*Primary Examiner* — Vu B Hang
(74) *Attorney, Agent, or Firm* — Kilpatrick Townsend & Stockton LLP

(57) ABSTRACT

Embodiments can take brain activity measurement and decode into continuous language. Embodiment can use non-invasive brain recordings, such as functional magnetic resonance imaging (fMRI) and functional near-infrared spectroscopy (fNIRS) to detect changes in blood oxygen level that are coupled to neural activity. These brain recordings can be used by a language reconstruction model that involves a neural language model to predict a next word in a sequence and an encoding model to decode the recordings into continuous language, or sequences of words.

19 Claims, 25 Drawing Sheets

200

(51) Int. Cl.
*G06F 40/169* (2020.01)
*G06F 40/274* (2020.01)
*G06F 40/30* (2020.01)
*G10L 15/183* (2013.01)

(58) Field of Classification Search
CPC ...... G06F 40/274; G06F 50/56; G06F 40/169; G06F 3/015; G10L 15/16; G10L 19/005; G10L 19/00; G10L 25/27; G10L 25/30; G10L 15/02; G10L 15/12; G10L 15/063; G10L 17/18; G10L 15/07; G10L 15/20; G10L 15/22; G10L 15/26; G10L 15/30; G10L 15/1822; G10L 15/183; G10L 15/193; G10L 15/19; G10L 15/24; A61B 5/0042; A61B 5/005; A61B 5/117; A61B 5/4803; A61B 5/741
See application file for complete search history.

(56) References Cited

OTHER PUBLICATIONS

Application No. EP23760602.5, Extended European Search Report, Mailed on Jan. 20, 2026, 5 pages.
Jain et al., "Incorporating Context Into Language Encoding Models for fMRI", Departments of Computer Science & Neuroscience, Dec. 2, 2018, 10 pages.
Schwartz et al., "Inducing Brain-relevant Bias in Natural Language Processing Models", Advances in Neural Information Processing Systems 32, Oct. 29, 2019, 18 pages.

100

200

300

400

| | WER | BLEU-1 | METEOR | BERTScore |
|---|---|---|---|---|
| Null | 0.9637 | 0.1908 | 0.1323 | 0.7899 |
| Subject 1 | 0.9407 | 0.2331 | 0.1621 | 0.8077 |
| Subject 2 | 0.9354 | 0.2426 | 0.1677 | 0.8104 |
| Subject 3 | 0.9243 | 0.2470 | 0.1703 | 0.8116 |
| Translation | 0.7459 | 0.4363 | 0.3991 | 0.8797 |

FIG. 7

810

| Actual stimulus | Left speech | Left assoc | Left PFC | Right speech | Right assoc | Right PFC |
|---|---|---|---|---|---|---|
| *i was like no i'm out of here this is great and i went and hid behind a cabana and he left* | they drove off they didn't even look back as i sat there thinking what the hell i should do | i ran outside and told them to leave me alone and go home i walked out the back | i told them to leave but they kept saying i can't stay here so i left and got my keys | ran away and didn't look back at me and said you can go on without me i'm leaving now | drop me off and go home but i could not leave without saying good bye i walked in the door | let me through i don't know where he is right now but i will get there soon enough |
| *i drew out this map for you and you're really you're like a mile and a half from home* | i try to keep track of how many miles it is before the number stops at the exact spot | up the street and make a left turn that would take me down to the first house on the right | the number on a map and find out how far they had to drive to reach the address | let me just walk away from the case and start the process of making sure | write down how many miles per hour you are traveling to the closest city | just to see how long it takes so i drove down the hill and over to the bank |

FIG. 8B

1304

Decoded segment 1 we got in my car and i was crying i didn't have my purse i don't have any money to pay for gas i wasn't a very good friend to anyone that i had known since my dad was an alcoholic he was abusive to everyone and it was very hard on me as well as him to do anything that he said or did i would say a word to him in anger or a threatening way in his case it was always just an excuse to leave and that was why i did it and i think that when i finally did i ended up moving to an area with very few houses on the property so the neighbors wouldn't hear my car stop in the driveway and run out and tell me to leave and not come back i said ok and went home to pack a bag i told her about it and she was like wow you know how you get on with a boyfriend after a couple weeks i went home and it was a beautiful evening and the party was getting really packed we had a table set for six

Actual segment 1 i reached over and secretly undid my seatbelt and when his foot hit the brake at the red light i flung open the door and i ran i had no shoes on i was crying i had no wallet but i was ok because i had my cigarettes and i didn't want any part of freedom if i didn't have my cigarettes when you live with someone who has a temper a very bad temper a very very bad temper you learn to play around that you learn this time i'll play possum and next time i'll just be real nice or i'll say yes to everything or you make yourself scarce or you run and this was one of the times when you just run and as i was running i thought this was a great place to jump out because there were big lawns and there were cul de sacs and sometimes he would come after me and drive and yell stuff at me to get back in get back in and i was like no i'm out of here this is great and i went and hid behind a cabana and he left and i had my cigarettes and uh i started to walk in this beautiful neighborhood it was ten thirty at night and it was silent and lovely and there was no sound except for sprinklers

1308

Q1) What kind of vehicle is the narrator in at the beginning of this passage?

a) Boat
b) Train
c) Car
d) Airplane

Q2) Which word best describes the narrator's boyfriend?

a) Gloomy
b) Angry
c) Lazy
d) Friendly

Q3) What kind of place does the narrator find herself in?

a) Restaurant
b) Store
c) Hospital
d) Neighborhood

Q4) When do the events of the story take place?

a) Morning
b) Noon
c) Afternoon
d) Night

FIG. 13B

DECODING LANGUAGE FROM NON-INVASIVE BRAIN RECORDINGS

CROSS-REFERENCES TO RELATED APPLICATIONS

This application is a U.S. National Stage of PCT International Application No. PCT/US2023/013618, filed on Feb. 22, 2023, which claims the benefit of and priority to U.S. Provisional Application No. 63/312,801, filed on Feb. 22, 2022, which are herein incorporated by reference in their entirety for all purposes.

BACKGROUND

Brain-computer interfaces (BCI) that serve as a direct communication pathway between the brain and an external device (such as a computer) have opened doors to wide range of possible applications. Specifically, brain-computer interfaces (BCI) that decode language can translate what a person is hearing, reading, or thinking from their brain activity into text. This can serve to help people who are cognitively normal but unable to speak. For example, this could help with locked-in syndrome or motor neuron disease (such as ALS).

However, there are major problems with existing language decoders. Current methods that use non-invasive (i.e. non-surgical) recordings can only decode single words, preventing users from having fluid conversations. Decoding continuous speech is possible using invasive recordings that require neurosurgery, but surgical implantation of recording devices carry additional risks for the user. The quality of signals obtained from surgically implanted recording devices can also degrade over time due to scarring, requiring further neurosurgery to replace or maintain the devices.

Embodiments of the invention address these and other problems, individually and collectively.

SUMMARY

Certain embodiments of the disclosure provide methods and systems that use non-invasive brain recordings to detect changes in blood oxygen level that are coupled to neural activity. These brain recordings can be used by a language reconstruction model that involves a neural language model to predict a next word in a sequence and an encoding model to decode the recordings into continuous language, or sequences of words.

These and other embodiments of the disclosure are described in detail below. For example, other embodiments are directed to systems, devices, and computer readable mediums associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 7 provides a table of language similarity scores.

FIGS. 8A and 8B provide analysis results of decoding from different cortical language networks.

FIGS. 13A and 13B provide analysis results of behavior assessment of language decoder predictions.

DETAILED DESCRIPTION

Previous brain-computer interfaces have demonstrated that speech articulation and other signals can be decoded from intracranial recordings to restore communication to people who have lost the ability to speak. While effective, these language decoders require invasive neurosurgery, making them unsuitable for most other uses. Language decoders that use non-invasive recordings could be more widely adopted and have the potential to be used for both restorative and augmentative applications. Non-invasive brain recordings can capture many kinds of linguistic information, but previous attempts to decode this information have been limited to identifying one output from among a small set of possibilities, leaving it unclear whether current non-invasive recordings have the spatial and temporal resolution required to decode continuous language.

To solve this problem, embodiments can determine a language decoder that can take non-invasive brain recordings and reconstructs perceived or imagined stimuli using continuous natural language. While methods that detect changes in blood oxygen level that are coupled to neural activity (such as fMRI) can have excellent spatial specificity, the blood-oxygen-level-dependent (BOLD) signal that it measures is notoriously slow—an impulse of neural activity causes BOLD to rise and fall over approximately 10 seconds. For naturally spoken English (over 2 words per second), this means that each brain image can be affected by over 20 words. Decoding continuous language thus requires solving an ill-posed inverse problem, as there can be many more words to decode than brain images. The embodiment can accomplish this by generating candidate word sequences, scoring the likelihood that each candidate evoked the recorded brain responses, and then selecting the best candidate.

Figure 11:
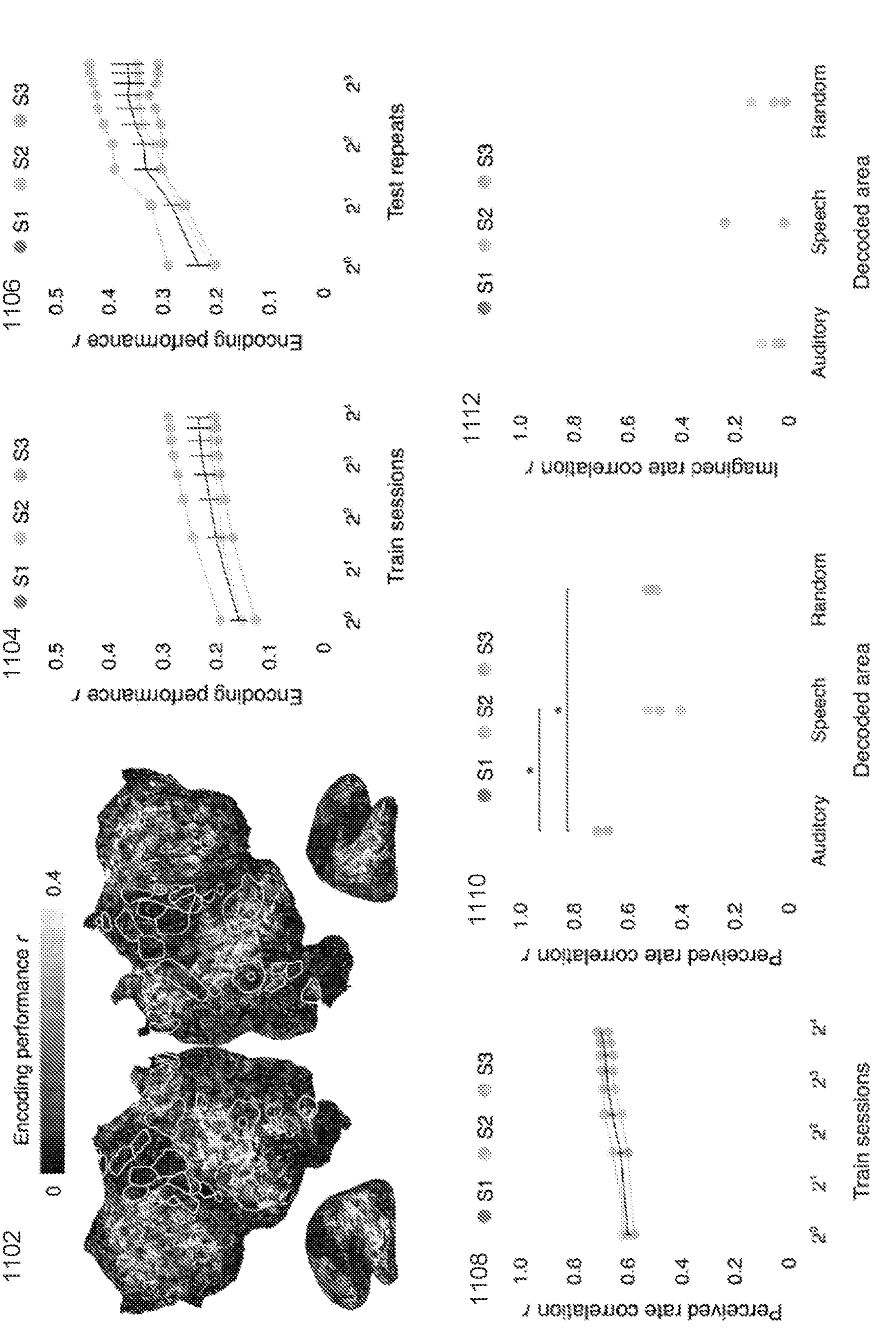
FIG. 11 provides analysis results of an encoding model and word-time decoder (i.e., word-rate model) performance.

To compare word sequences to a subject's brain responses, the embodiment can use an encoding model that predicts how the subject's brain responds to natural language. The embodiment can record brain responses while the subject listened to naturally spoken narrative stories. The embodiment can train the encoding model on this dataset by extracting semantic features that capture the meaning of stimulus phrases and using linear regression to model how the semantic features influence brain responses (602 of FIG. 6A). Given any word sequence, the encoding model predicts how the subject's brain would respond when hearing the sequence with considerable accuracy (FIG. 11). The encoding model can then score the likelihood that the word sequence evoked the recorded brain responses by measuring how well the recorded brain responses match the predicted brain responses.

In theory, most likely stimulus words can be identified by comparing the recorded brain responses to encoding model predictions for every possible word sequence. However, the number of possible word sequences is far too large for this approach to be practical, and the vast majority of such sequences may not resemble natural language. To restrict the candidate sequences to well-formed English, the embodiment can use a neural network language model that was trained on a large dataset of word sequences. Given any word sequence, the language model can predict the words that could come next.

Yet even with the constraints imposed by the language model, it is computationally infeasible to generate and score all candidate sequences. To efficiently search for the most likely word sequences, the embodiment can use a beam search algorithm that can generate candidate sequences word by word. In beam search, the language decoder can maintain a beam (i.e., hypothesis beam) containing the k most likely candidate sequences at any given time. When new words are detected based on brain activity in auditory and speech areas (FIG. 11), the neural language model can generate continuations for each sequence in the beam using the previously decoded words as context. The encoding model can then score the likelihood that each continuation evoked the recorded brain responses, and the k most likely continuations can be retained in the beam for the next timestep (604 of FIG. 6A). This process can continually approximate the most likely stimulus words across an arbitrary amount of time.

In short, the embodiment can take brain activity measurement and decode into a continuous language. The current embodiment can use non-invasive brain recordings, such as functional magnetic resonance imaging (fMRI) and functional near-infrared spectroscopy (fNIRS), to detect changes in blood oxygen level that are coupled to neural activity and take a brain activity measurement. The brain activity measurement obtained using the FMRI and fNIRS can have a current time period of 1 to 5 seconds. Some embodiments may use electrical signals from neurons or magnetic fields in the brain, such as magnetoencephalography (MEG), to record brain measurements of the neural process. The brain activity that are measured may not necessarily be caused by language, although they may be used to decode the language. For example, a person may watch a silent movie, and the brain recording of a person watching a silent movie may be recorded and decoded into a continuous language.

I. Training Encoding Model

Figure 1:
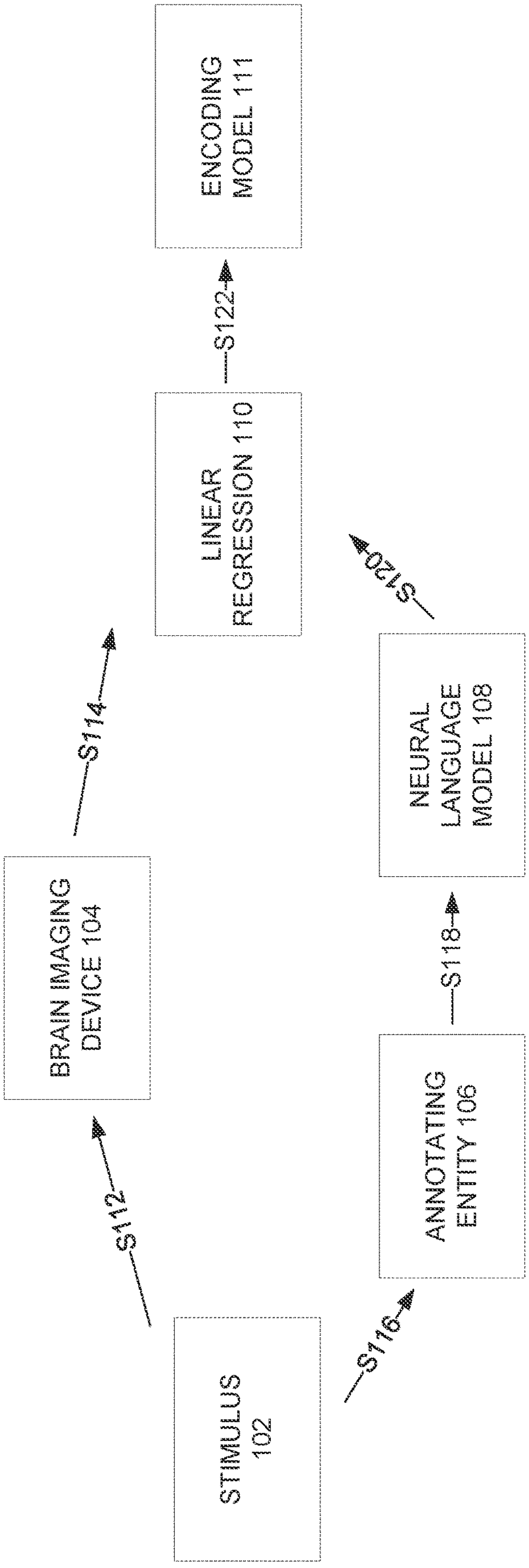
FIG. 1 provides a flow diagram of a supervised learning that trains encoding model to predict brain activity measurements of a continuous language, or sequences of words.
Figure 2:
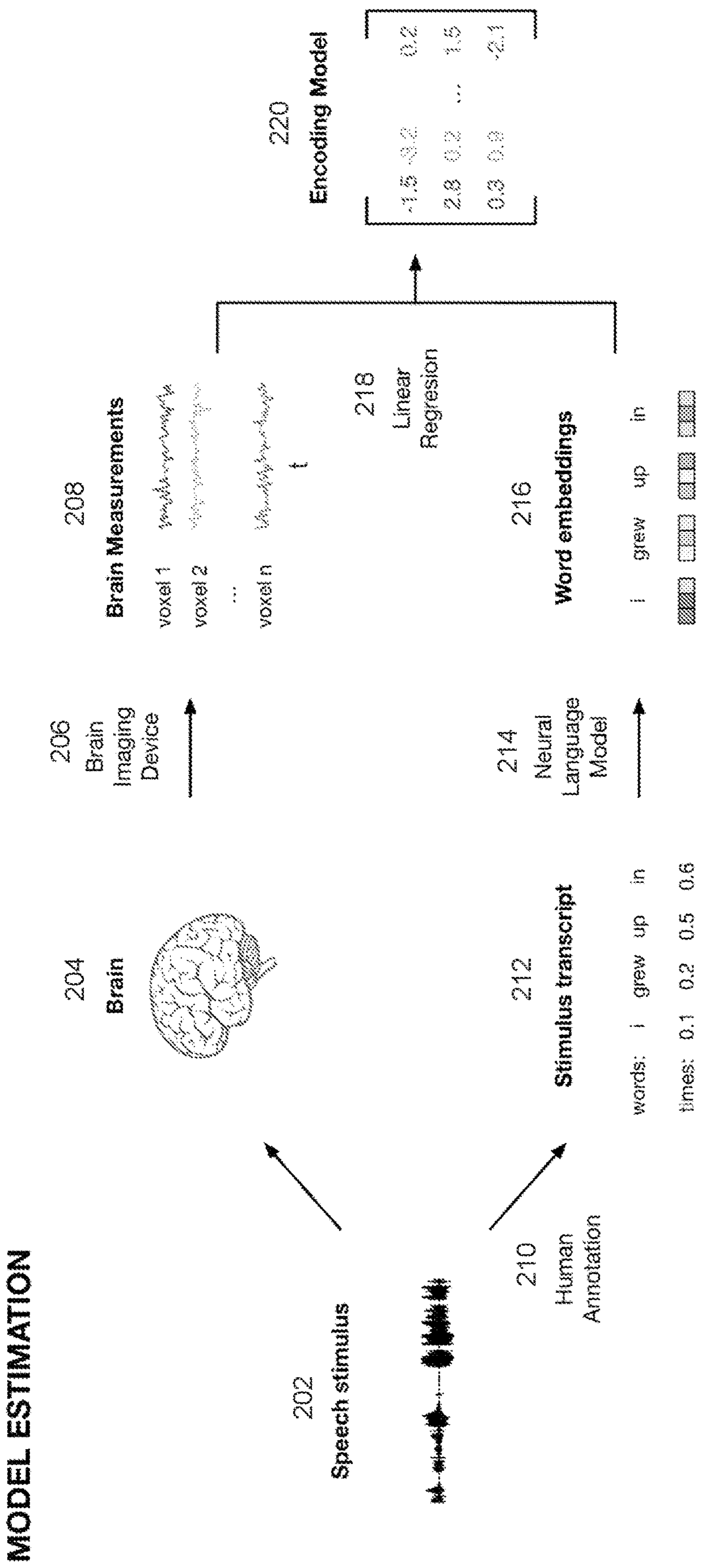
FIG. 2 provides a flow diagram of examples for each step of FIG. 1.

FIG. 1 shows a supervised learning that trains encoding model 111 to predict brain activity measurements of a stimulus 102. The brain imaging device 104 measures brain activity while the subject takes in the stimulus 102. An annotating entity 106 and a neural language model 108 are used to convert sequences of words (stimulus 102) into sequences of word embedding vectors. The actual brain measurements are than used in comparison by the linear regression 110 to train encoding model 111 that converts the sequences of word embedding vectors into brain activity images. FIG. 2 illustrates examples of different measurements that are taken by FIG. 1 in order to train the encoding model 220. The flow diagram of FIG. 2 has the same process as the FIG. 1

A. Brain Activity Measurements

In S112, the brain imaging device 104 measures the activity of different parts, or voxels, of the brain at the time the subject is thinking, reading, or listening the stimulus 102. The brain imaging device 104 may be fMRI, fNIRS, and etc. that can measure the blood oxygen level of the subject. Examples of collecting activities of different parts of the brain can be collecting MRI data on a 3T Siemens Skyra scanner using a 64-channel Siemens volume coil. Functional scans can be collected using gradient echo EPI with repetition time (TR)=2.00 s, echo time (TE)=30.8 ms, flip angle=71°, multi-band factor (simultaneous multi-slice)=2, voxel size=2.6 mm×2.6 mm×2.6 mm (slice thickness=2.6 mm), matrix size=(84, 84), and field of view=220 mm. Anatomical data can be collected using a T1-weighted multi-echo MP-RAGE sequence on the same 3T scanner with voxel size=1 mm×1 mm×1 mm following the Freesurfer morphometry protocol. Anatomical data can be collected on a 3T Siemens TIM Trio scanner with a 32-channel Siemens volume coil using the same sequence.

The stimulus 102 is measured by the brain imaging device 104 at the exact time the annotating entity 106 labels the sequences of words with times. For example, if the subject thinks of a sequence of words "I have a dog", the exact times that the subject thought of each word must be recorded by the annotating entity 106. Therefore, the stimulus 102 is typically presented to the subject using a computer that is synchronized with the brain imaging device 104, which allows the annotating entity to temporally align the labeled stimulus with the brain activity measurements The labeling of the sequences of words by the annotating entity 106 and brain activity measurements made by the brain imaging device 104 may not necessarily at the same time. For example, the stimulus 102 and the brain activity images may be pre-recorded, and the recordings may be given to the annotating entity 106 at a later time. The annotating entity 106 can then label the times of the words in the recording at any other time.

The stimulus 102 and step S112 are illustrated in FIG. 2 with a speech stimulus 202 and brain 204. The speech stimulus 202 is received by the brain 204. This may involve the speech stimulus 202 being thought, read, or listened to by the subject of the brain 204. Upon the brain 204 receiving the speech stimulus 202, the brain imaging device 206 may measure the brain activity of the subject. The brain imaging device 206 may measure the brain activity for each voxel of the brain, each voxel eliciting a different measurement. An example of the voxel measurements is shown in brain measurement 208, where there are up to n voxels, and each voxel having its own measurement over time t.

In S114, the brain activity measurements of different voxels of the brain are sent to the linear regression 110. Depending on a brain imaging device 104, the acquisition time for the brain imaging device 104 to obtain a brain activity image may vary. For fMRI, the acquisition time for getting a brain activity image may be two seconds. The stimulus 102 may be broken down into sequences of words such that each sequence of words correlates to a number of words perceived/received by the subject in one or more acquisition times. Even though there may be one brain activity image measured for every acquisition time period and one sequence of words spoken for every acquisition time period, the words from previous time periods can affect the measured brain activity in subsequent time periods. The linear regression 110 uses brain activity measurements made by the brain imaging device 104 to compare with the sequences of words to find the encoding model 111.

In cases where certain brain regions are more intact or more accessible, the embodiment can target those specific brain regions. For instance, brain activity measurements (e.g., whole brain MRI data) can be partitioned into 3 cortical regions: the speech network, the parietal-temporal-occipital association region, and the prefrontal region. Examples of how the brain activity are measured can be specified in details below.

The speech network can be functionally localized in each subject using an auditory localizer and a motor localizer. Auditory localizer data can be collected in one 10 min scan. The subjects can listen to 10 repeats of a 1 min auditory stimulus containing 20 s of music (e.g., Arcade Fire), speech (e.g., Ira Glass, This American Life), and natural sound (e.g., a babbling brook). To determine whether a voxel was responsive to the auditory stimulus, the repeatability of the voxel response was quantified using an/statistic which can be computed by taking the mean response across the 10 repeats, subtracting this mean response from each single-trial response to obtain single-trial residuals, and dividing the variance of the single-trial residuals by the variance of the single-trial responses. This metric can directly quantify the amount of variance in the voxel response that can be explained by the mean response across repeats. The repeatability map can be used by a human annotator to define the auditory cortex (AC). Motor localizer data can be collected in two identical 10 min scans. The subject can be cued to perform six different tasks ("hand", "foot", "mouth", "speak", "saccade", and "rest") in a random order in 20 s blocks. For the "speak" cue, subjects can be instructed to self-generate a narrative without vocalization. Linear models can be estimated to predict the response in each voxel using the six cues as categorical features. The weight map for the "speak" feature can be used by a human annotator to define Broca's area and the superior ventral premotor (sPMv) speech area. Unlike the parietal-temporal-occipital association and prefrontal regions, there can be broad agreement that these speech areas are necessary for speech perception and production. Most existing invasive language decoders can record brain activity from these speech areas.

The parietal-temporal-occipital association region and the prefrontal region can be anatomically localized in each subject using Freesurfer ROIs. The parietal-temporal-occipital association region can be defined using the superiorparietal, inferiorparietal, supramarginal, postcentral, precuneus, superiortemporal, middletemporal, inferiortemporal, bankssts, fusiform, transversetemporal, entorhinal, temporalpole, parahippocampal, lateraloccipital, lingual, cuneus, pericalcarine, posteriorcingulate, and isthmuscingulate labels. The prefrontal region can be defined using the superiorfrontal, rostralmiddlefrontal, caudalmiddlefrontal, parsopercularis, parstriangularis, parsorbitalis, lateralorbitofrontal, medialorbitofrontal, precentral, paracentral, frontalpole, rostralanteriorcingulate, and caudalanteriorcingulate labels. Voxels identified as part of the speech network (AC, Broca's area, and sPMv speech area) can be excluded from the parietal-temporal-occipital association region and the prefrontal region. A functional definition can be used for the speech network since previous studies have shown that the anatomical location of the speech network varies across subjects, while anatomical definitions can be used for the parietal-temporal-occipital association region and the prefrontal region since these regions are broad and functionally diverse.

B. Labeling

In S116, the stimulus 102 gets labeled by the annotating entity 106. The annotating entity 106 labels the stimulus 102 by labeling the identity (which word is used) and time of each word thought, read, or listened by the user. For example, if the sequence of words is "I have a dog", then the annotating entity 106 may label times of each word in the sequence. The times of each word may be labeled by speaking the stimulus 102 directly to the user and the annotating entity 106, so that the annotating entity 106 may be able to accurately measure the exact time in which the sequences of words have been spoken to, or heard by, the user and synchronize the stimulus annotations with the brain activity measurements. The annotating entity 106 may be any device that may be able to recognize the words in the stimulus 102, such as an automatic speech recognition software, or may be a human capable of annotating the times. The annotating entity 106 can be done by a human annotation for accurate measurements, but may also be done by software, e.g., a natural language processor. In one embodiment, a human annotator manually transcribes the words in the stimulus audio file, software is used to automatically predict word times by aligning the transcript words with the stimulus audio file, and the human annotator manually validates the alignment.

The step S116 is illustrated in FIG. 2 by a human annotation 210 and a stimulus transcript 212. The speech stimulus 202 is labeled by a human with times of each word. This is represented as a human annotation 210. This would result in a stimulus transcript 212, where each word of the transcript is labeled with a time. For example, in stimulus transcript 212, each word in a sequence of words "I grew up in" is labeled with a time. "I" is labeled with 0.1, "grew" is labeled with 0.2, "up" is labeled with 0.5, and "in" is labeled with 0.6.

In S118, the neural language model 108 receives a sequence of words of the stimulus 102 labeled with times by the annotating entity 106. The labeled sequence of words goes through quantitative feature transformations that change each labeled word in the sequence of words as a word embeddings (features) vector using the neural language model 108. The neural language model 108 does not predict the next word but rather extract meaningful representations of each word in the sequence.

The extracted word embeddings of each word in the sequence may represent something about both the meaning (semantic) and the form (syntax) of the word. The extracted word embeddings are learned and determined automatically by neural networks in the neural language model 108. For example, if a sequence of words is "I have a dog", then the neural networks in neural language model 108 may determine automatically 3 embeddings, or features, for a word "I", which may represent something about both the meaning and the form of the word. These extracted embeddings, or features, may be written as a vector of numerical values, each value representing a different extracted feature of a word.

An example of a neural language model 108 can be a generative pre-trained transformer (GPT), which is trained to predict the next word in a sequence given the previous words. GPT can be used to extract semantic features from language stimuli. In order to successfully perform the next word prediction task, GPT can learn to extract quantitative features that capture the meaning of input sequences. Given a word sequence $S=(s_1, s_2, \ldots, s_n)$, the GPT hidden layer activations can provide vector embeddings that represent the meaning of the most recent word $s_n$ in context.

The step S118 is illustrated in FIG. 2 with stimulus transcript 212. The stimulus transcript 212 is inputted into the neural language model 214 to produce the word embeddings 216. As shown in the word embeddings 216, each word in a sequence "I grew up in" has a word embedding vector underneath each word with three different features.

C. Synchronization

In order to map the extracted features of the stimulus into brain activity images, there ideally would be a brain activity measurement for every word. However, there are typically 4-8 words in a sequence of words, and there is exactly one sequence of words for every one brain activity image in one acquisition time interval. Therefore, there are typically 4-8 times more words than brain activity images.

In order to match the number of stimulus measurements with the number of brain activity images, the words in the sequence are down sampled to produce a single averaged word embedding vector, which is done by taking averages of the word embedding vectors of the words in the sequence. In some embodiment, the down sampling may be done by other technique such as a Lanczos kernel. For example, if a sequence of words is "I have a dog", the four word embedding vectors for the sequence of words "I have a dog" are averaged together to produce a single averaged word embedding vector. This average may weight the word embeddings by the differences between the word times and the brain image acquisition time.

A sequence of words doesn't just have one immediate response. It has a response that evolves over time. A sequence of words can affect about the next 8 seconds of brain activity measurements, or 4 time periods for measurement using fMRI. For example, if a first sequence of words is "I have a dog", then the sequence not only affects a first brain activity image made by the brain imaging device 206, but may affect a second, third, or fourth brain activity images. Therefore, each brain activity image at one time can be modeled as a function of the words that happened at the previous 4 acquisition time periods, or 4 previous sequences of words.

Since each sequence of words may have different degrees of influence on brain activity images at different time points in the future, a learned convolution kernel is used to assign different coefficient for each of the 4 previous sequences of words, or 4 previous averaged word embedding vectors. For example, the oldest sequence of words may have less influence on the brain activity image than the newest sequence of words. The convolution kernel of different weights is applied to the 4 previous averaged word embedding vectors to produce a final word embedding vector. The final word embedding vector is used to predict a brain activity image.

For example, if a first sequence of words is "I have a dog", a second sequence of words is "and a puppy", a third sequence of words is "that I raised", and a fourth sequence of words is "since I was six", each sequence of words would produce a single averaged word embedding vector, and each of the four averaged vectors would go through a convolution kernel to produce a first final word embedding vector that would be used to match it to the fourth brain activity image. The fifth brain activity image would correlate with a second, third, fourth, and fifth sequences of words, and so on.

D. Linear Regression

In S120, once the final word embedding vector is determined, the final word embedding vector is sent to the linear regression 110. The linear regression 110 may take each feature in the final word embedding vector and determine a linear mapping into a voxel space. This is done by using a regularized linear regression to determine the encoding model 111 that predicts how the final word embedding vector affects brain responses (responses of each voxel) by fitting each feature of the vector into the brain activity measurement of voxels. Because the encoding model 111 is mapping the features of the final word embedding vector into the voxels of the brain, the encoding model 111 would be a matrix with a dimension of J×L, in which J is the number of features and L is the number of voxels.

The linear regression 110 is illustrated in FIG. 2 with a linear regression 218. The sequences of words in word embeddings 216, which are transformed, averaged, and convoluted into a final word embedding, tries to map each feature in the final word embedding to each voxel in the brain measurements 208. The linear regression 218 is used to determine the encoding model 220 that maps each feature of the word embeddings 216 into each voxel of the brain measurements. If there are three features in the word embeddings 216, and n number of voxels in the brain measurements 208, the encoding model 220 would have a dimension of 3 by n, where each row represents a feature and each column represents a voxel.

In some embodiments, a word-time decoder can also be trained using linear regression 110. The word-time decoder predicts when words are thought, read, or listened to by the subject. Although the word times are recorded by the annotating entity 106, in a real language reconstruction, the times of when each word is spoken would be unknown. The word-time decoder learns a mapping between a brain activity measurement and a vector of word rates, or a number of words in a sequence, at each acquisition time. This mapping is estimated for each sequence of words in stimulus 102 using a linear regression 110. For example, the input can be T×A responses for A voxels associated with word timing information, the output can be T×1, and the learned weights can be A×1).

To predict word rate during perceived speech, brain responses can be restricted to the auditory cortex. To predict word rate during imagined speech and perceived movies, brain responses can be restricted to Broca's area and the sPMv speech area. A separate linear temporal filter with four delays (t+1, t+2, t+3, and t+4) can be fit for each voxel. With a TR of 2 s this was accomplished by concatenating the responses from 2, 4, 6, and 8 s later to predict the word rate at time t. Given novel brain responses, this model can predict the word rate at each acquisition. The time between consecutive acquisitions (e.g., 2 s) can then be evenly divided by the predicted word rates (rounded to the nearest non-negative integers) to predict word times.

In S122, the encoding model 111 is determined by the linear regression 110 that best converts the final word embedding vector into the actual brain activity measurement. The weights of convolution kernel may also be jointly trained with the linear regression 110 to estimate the best final word embedding vector that best converts to actual brain acidity measurements. The encoding model 111 is tuned until all the brain activity images measured by the brain imaging device 104 are used to train the encoding model 111. The encoding model 111 is later used by the language reconstruction model FIG. 3 to come up with brain predictions, which would be compared with brain measurements.

II. Language Reconstruction

Once the tuning for the encoding model is done, the encoding model may be used by the language reconstruction model. The language reconstruction model may take a new stimulus, where the stimulus may not be known, and reconstruct brain measurements of the new stimulus made by a brain imaging device into a continuous language prediction of this new stimulus.

Figure 3:
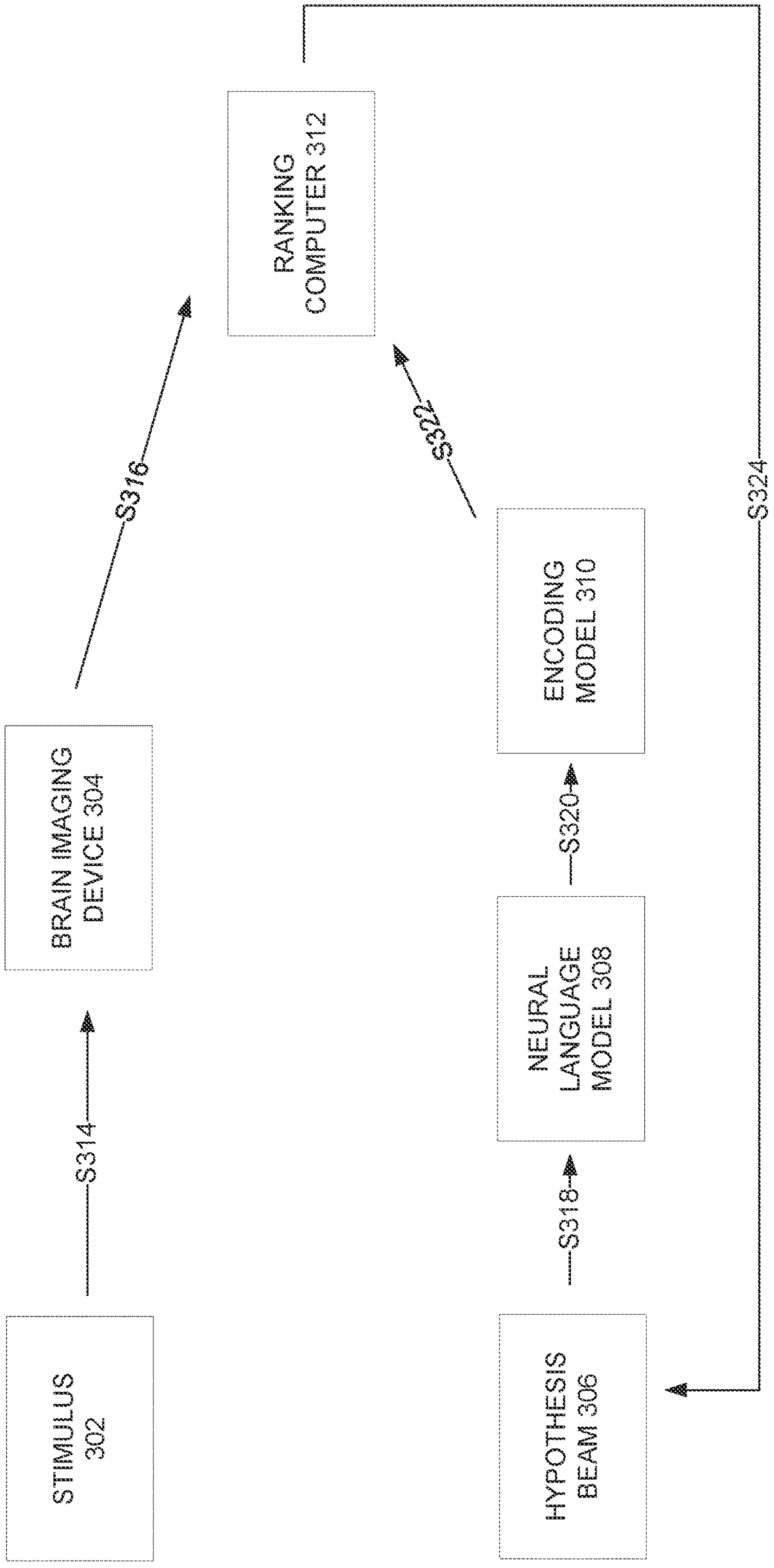
FIG. 3 provides a flow diagram of language reconstruction that translates brain activity measurements into a continuous language, or sequences of words.
Figure 4:
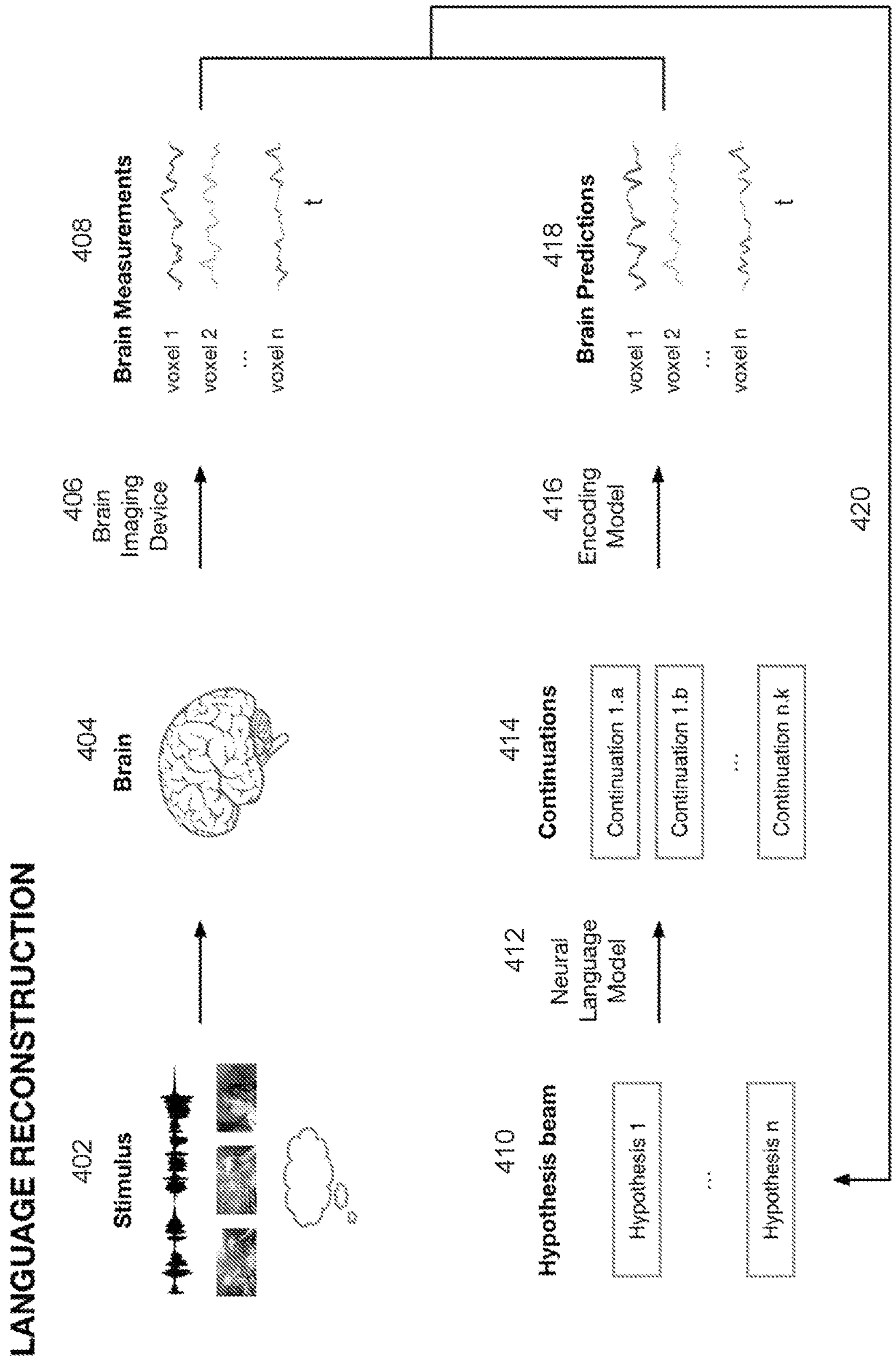
FIG. 4 provides a flow diagram of examples for each step of FIG. 3.

FIG. 3 shows a flow diagram of language reconstruction that translates brain measurements, or images, of a subject (user) into continuous language, or sequences of words. In some embodiments, the brain imaging device 304 outputs brain activity measurements while the subject takes in the stimulus 302. Each brain measurement made by the brain imaging device 304 is then used to compare with a plurality of brain predictions of continuations (also referred to as extended hypotheses) to identify most likely brain predictions by a ranking computer 312. The continuations are built by combining each hypothesis (an initial hypothesis to start with) in a hypothesis beam 306 with a set of continuation words predicted by a Neural Language model 308. The continuations then go through an encoding model 310 to convert the continuations into the plurality of brain predictions. FIG. 4 illustrates examples of different measurements that are taken by FIG. 3 in order to translate brain measurements into sequences of words. The flow diagram of FIG. 4 has the same process as the FIG. 3.

Under Bayes' theorem, the distribution P(S|R) over word sequences(S) given brain responses (R) can be factorized into a prior distribution P(S) over word sequences and an encoding distribution P(R|S) over brain responses given word sequences. Given novel brain responses $R_{test}$, the most likely word sequence $S_{test}$ could theoretically be identified by evaluating P(S)—with the language model—and $P(R_{test}|S)$—with the subject's encoding model—for all possible word sequences S. However, the combinatorial structure of natural language makes it computationally infeasible to evaluate all possible word sequences. Instead, the most likely word sequence can be predicted using a beam search algorithm involving hypothesis beam 306, neural language model 308, encoding model 310, and ranking computer 312 of FIG. 3.

The embodiment, or the language decoder, can maintain a beam containing the k most likely word sequences. The hypothesis beam can be initialized with an empty word sequence. When new words are detected by the word rate model (i.e., word-time decoder), the neural language model can generate continuations for each candidate S in the beam. The neural language model can use the last 8 seconds of predicted words $(s_{n-i}, \ldots, s_{n-1})$ in the candidate to predict the distribution $P(s_n|s_{n-i}, \ldots, s_{n-1})$ over the next word. Nucleus sampling can be used to identify K words that belong to the top p percent of the probability mass and have a probability within a factor r of the most likely word. Each of the K words in the nucleus can be appended to the candidate to form a continuation C.

The encoding model can score each continuation by the likelihood $P(R_{test}|C)$ of observing the recorded brain responses. The k most likely continuations across all candidates are retained in the hypothesis beam. After iterating through all of the predicted word times, the decoder can output the candidate sequence with the highest likelihood.

The embodiment's use of Bayesian decoder, or the beam search algorithm, can be unique in two important ways. First, existing Bayesian decoders can typically collect a large empirical prior of images or videos, and only compute P(R|S) for stimuli in the empirical prior. The decoder prediction can be obtained by choosing the most likely stimulus or taking a weighted combination of the stimuli. In contrast, the embodiment uses a neural language model prior, which can produce completely novel sequences. Second, existing Bayesian decoders can evaluate all stimuli in the empirical prior. In contrast, embodiment can use the beam search algorithm to efficiently search the combinatorial space of possible sequences, so the words that are evaluated at each point in time depend on the words that were previously decoded.

A. Brain Measurements

In S314, the stimulus 302 is sent to the brain imaging device 304. The brain imaging device 304 measures the activity of different parts, or voxels, of the brain at the time the subject is thinking, reading, or listening to the stimulus 302. The brain imaging device 304 may be fMRI, fNIRS, and etc. that can measure the blood oxygen level of the subject. The brain activity measurements can be made throughout different time periods. A single brain activity measurement can comprise L brain measurements, or L voxels, of the subject for a single time period. For example, the brain imaging device 304 can measure the brain activity measurement for a current time period. The brain activity measurements made by the brain imaging device 304 and a continuous language prediction by the ranking computer 312 may not necessarily happen at the same time. The brain activity images of the brain activity measurements may be pre-recorded, and the recordings may be given to the ranking computer 312 at a later time to generate a continuous language prediction.

The step S314 is illustrated in FIG. 4 by a stimulus 402 and a brain 404. The stimulus 402 is received by the brain 404. This may involve the stimulus 402 being thought, read, or listened to by the user's brain 404. Upon the brain 404 receiving the speech stimulus 402, the brain imaging device 406 may measure the brain activity of the user. The brain imaging device 406 may measure the brain activity for each voxel of the brain, each voxel eliciting a different measurement. An example of the voxel measurements is shown in brain measurement 408, where there are up to n voxels, and each voxel having its own measurement over time t.

In S316, the brain activity measurements of different voxels of the brain are sent to the ranking computer 312. Depending on a brain imaging device 304, the acquisition time for the brain imaging device 304 to obtain a brain activity image may vary. For fMRI, the acquisition time for getting a brain activity image may be two seconds. The stimulus 302 may be sequences of words, where each sequence of words is provided to the subject in one acquisition time. Therefore, there is one brain activity image and one sequence of words for every one acquisition time period, although words in one time period can affect measurements in later time periods.

B. Neural Language Model

The hypothesis beam 306 have N initial hypotheses. Each hypothesis is composed of sequences of word(s). The hypothesis beam 306 contain N best combined sequences of words in the current model. Each hypothesis can be of a same number of words. At the start of the language reconstruction, the default values of the hypothesis beam 306 may contain N initial hypotheses. The N initial hypotheses may be customized based on different use cases. For example, the N initial hypotheses may be pronouns or the top 50 most commonly used words or phrases as a starting point. In one embodiment, pronouns can begin sentences ("i", "we", "they", "she", "he"). The start words can be customized based on the decoder use-case.

In S318, each hypothesis is inputted into the neural language model 308. The neural language model 308 predicts a corresponding set of K possible continuation words for each hypothesis. For example, if the hypothesis I has a sequence of words such as "we went", then the corresponding set of K continuation words can be "to", "hiking", etc. Each hypothesis can be combined with the corresponding set of K continuation words. Because each of the N hypothesis has the set of K continuation words, there are N*K total continuations after going through the neural language model 308. A continuation may be a combination of a hypothesis and a continuation word. Each of the N*K continuation is also transformed into a set of word embedding vectors similar to the transformation described in step S120. Each word in the continuation has a word embedding vector, and each continuation has a set of word embedding vectors. Therefore, N*K total continuations would have N*K sets of word embedding vectors.

The set of K continuation words should be specific to their parent hypotheses. For example, if two hypotheses are "i grew up in" and "i grew up around", then the continuations for the first hypothesis may include "i grew up in Georgia" and "i grew up in suburbia" while continuation for the second hypothesis may include "i grew up around doctors" and "i grew up around animals". Therefore, the set of K continuation words are unique for each parent hypothesis.

An example of neural language model 308 can be a transformer large language model (LLM) such as the generative pre-trained transformer (GPT). The LLM can be a 12 layer neural network which uses multi-head self-attention to combine representations of each word in a sequence with representations of previous words. The LLM can be trained on a large corpus of books to predict the probability distribution over the next word $s_n$ in a sequence $(s_1, s_2, \ldots, s_{n-1})$.

The LLM can estimate a prior probability distribution P(S) over word sequences. Given a word sequence $S=(s_1, s_2, \ldots, s_n)$, the LLM can compute the probability of observing S in natural language by multiplying the probabilities of each word conditioned on the previous words:

$$P(S) = \prod_1^n P(s_i|s_{1:i-1})$$

where $s_{1:0}$ is the empty sequence ø.

The LLM can also be used to extract semantic features from language stimuli (as shown in FIG. 1). In order to successfully perform the next word prediction task, the LLM can learn to extract quantitative features that capture the meaning of input sequences. Given a word sequence $S=(s_1, s_2, \ldots, s_n)$, the LLM hidden layer activations provide vector embeddings that represent the meaning of the most recent word $s_n$ in context.

The step S318 is illustrated in FIG. 4 of a hypothesis beam 410 and a neural language model 412. The hypothesis beam 410 has N hypotheses, shown as "Hypothesis 1 . . . Hypothesis n". The N hypotheses will go through a neural language model 412 that will predict K continuation words for each hypothesis. This will result in N*K continuations 414. In continuations 414, the numbers reflect the Nth hypothesis while the letters reflect the Kth continuation word. Therefore, "Continuation 1.b" would stand for a combination of the first hypothesis with a second continuation word predicted by the neural language model 412.

C. Synchronization

Each continuation is composed of sequences of words, where each sequence of words correlates to number of words perceived by the subject in one acquisition time (i.e., time period). However, because the words are not labeled with times, and the words in continuations are predictions made by the neural language model 308, the number of words that comprise each sequence is unknown. In order to solve this issue, the word-time decoder that was trained in FIG. 1 predicts the word rate, or the number of words in a sequence, at each acquisition time, and the time between acquisitions is evenly divided by the predicted word rate to approximate word times. Therefore, the word-time decoder predicts word rate in each sequence and labels times for each word. In one example, the decoder can perform an aggregation that determines the number of words for each interval, e.g., 8 words for interval 0-2 s, 4 words for interval 2-4 s, and 5 words for interval 4-6 s. The word rate decoder can be implemented using a linear regression.

In order to map the extracted embeddings, or features, of the stimulus into a brain activity image, every word should have a brain acidity measurement. However, there are typically 4-8 words in a sequence of words, and there is one sequence of words for every one brain activity image in one acquisition time interval. Therefore, there are typically 4-8 times more words than brain activity images.

In order to match the number of words with the number of brain activity images, the words in the sequence are down sampled to produce a single averaged word embedding vector, which is done by taking averages of the word embedding vectors of the words in the sequence. For example, if a sequence of words is "I have a dog", the four word embedding vectors for the sequence of words "I have a dog" are averaged together to produce a single averaged word embedding vector. In some embodiment, the down sampling may be done by other technique such as a Lanczos kernel.

A sequence of words doesn't just have one immediate response. It has a response that evolves over time. A sequence of words can affect about the next 8 seconds of brain activity measurements, or 4 time periods for measurement using fMRI. For example, if a first sequence of words is "I have a dog", then the sequence not only affects a first brain activity image made by the brain imaging device 304, but may affect a second, third, or fourth brain activity images. Therefore, each brain activity image at one time is going to be a function of the words that happened at the previous 4 acquisition time periods, or 4 previous sequences of words.

Since each sequence of words may have different degrees of influence on brain activity images at different time points in the future, a learned convolution kernel can be used to assign different coefficient for each of the 4 previous sequences of words, or 4 previous averaged word embedding vectors. For example, the oldest sequence of words may have less influence on the brain activity image than the newest sequence of words. The convolution kernel of different weights is applied to the 4 previous averaged word embedding vectors to produce a final word embedding vector. The final word embedding vector is determined for each N*K continuations before inputting into the encoding model 310. During encoding model estimation, the weights of convolutional kernel can be jointly learned with the weights on the stimulus features. Accordingly, the convolution kernel can comprise different weights, where each weight is determined based on degrees of influence the averaged word embedding vector and the previous averaged word embedding vectors have on the brain activity measurement of the subject for the current time period.

D. Prediction of Brain Activity Images

In S320, once the N*K final word embedding vectors are determined the N*K final word embedding vectors are sent to the encoding model 310. In the encoding model 310, each final word embedding vector is transformed into a brain prediction (i.e., a predicted brain response). The encoding model 310 is a feature by voxel matrix that transforms the features of the final word embedding vectors into L voxels of brain activity measurements (i.e., L candidate response values). Encoding model can further be specified with examples in details below.

In the voxel-wise modeling, quantitative features can be extracted from stimulus words, and regularized linear regression is used to estimate a set of weights that predict how each feature affects the BOLD signal in each voxel.

A stimulus matrix can be constructed from the stimulus 102 (e.g., training stories). For each word-time pair ($s_i$, $t_i$) in each story, the word sequence ($s_{i-5}$, $s_{i-4}$, . . . , $s_{i-1}$, $s_i$) can be provided to the GPT language model and extracted semantic features of $s_i$ from the ninth layer. Previous studies have shown that middle layers of language models extract the best semantic features for predicting brain responses to natural language. This can yield a new list of vector-time pairs ($M_i$, $t_i$) where $M_i$ is a 768-dimensional semantic embedding for $s_i$. These vectors can be then resampled at times corresponding to the fMRI acquisitions using a 3-lobe Lanczos filter.

A linearized finite impulse response (FIR) model can be fitted to every cortical voxel in each subject's brain. A separate linear temporal filter with four delays (t−1, t−2, t−3, and t−4 time-points) can be fitted for each of the 768 features, yielding a total of 3,072 features. With a TR of 2 s this was accomplished by concatenating the feature vectors from 2, 4, 6, and 8 s earlier to predict responses at time t. Taking the dot product of this concatenated feature space with a set of linear weights can be functionally equivalent to convolving the original stimulus vectors with linear temporal kernels that have non-zero entries for 1-, 2-, 3-, and 4-time-point delays. Before doing regression, each feature channel across the training matrix can be z-scored. This can be done to match the features to the fMRI responses, which were z-scored within each scan.

The 3,072 weights for each voxel can be estimated using L2-regularized linear regression. The regression procedure has a single free parameter which can control the degree of regularization. This regularization coefficient can be found for each voxel in each subject by repeating a regression and cross-validation procedure 50 times. In each iteration, approximately a fifth of the time-points were removed from the model training dataset and reserved for validation. Then the model weights can be estimated on the remaining time-points for each of 10 possible regularization coefficients (log spaced between 10 and 1,000). These weights can be used to predict responses for the reserved time-points, and then $R^2$ can be computed between actual and predicted responses. For each voxel, the regularization coefficient can be chosen as the value that led to the best performance, averaged across bootstraps, on the reserved time-points. The 10,000 cortical voxels with the highest cross-validation performance were used for decoding.

The encoding model 310 can estimate a function $\hat{R}$ that maps from semantic features the word sequence S to predicted brain responses $\hat{R}(S)$. Assuming that brain oxygen level dependent (BOLD) signals, brain signals measured by fMRI, are affected by Gaussian additive noise, the likelihood of observing brain responses R given semantic features S can be modeled as a multivariate Gaussian distribution $P(R|S)$ with mean $\mu=\hat{R}(S)$ and covariance $\Sigma=\langle (R-\hat{R}(S))^T (R-\hat{R}(S))\rangle$.

Previous studies estimated the noise covariance Σ using the residuals between the predicted responses and the actual responses to the training dataset. However, this underestimates the actual noise covariance, because the encoding model learns to predict some of the noise in the training dataset during model estimation. To avoid this issue, covariance Σ using a bootstrap procedure can be estimated. Each story was held out from the model training dataset, and an encoding model can be estimated using the remaining data. A bootstrap noise covariance matrix for the held out story can be computed using the residuals between the predicted responses and the actual responses to the held out story. The covariance Σ can be estimated by averaging the bootstrap noise covariance matrices across held out stories.

The encoding model 310 is illustrated in FIG. 4 by an encoding model 416. The continuations 414, after going through transformations, averages, and convolutions, are inputted into the encoding model 416 to transform features of sequences in continuations 414 into L voxels of brain activity measurements (i.e., L candidate response values) to output the plurality of brain predictions 418 (i.e., a plurality of predicted brain responses). Each candidate response value can correspond to a measurement of a different voxel (i.e., part of the brain) or to a different sensor. An example of a brain prediction is shown in brain predictions 418 which has n number of voxels similar to the brain measurements 408.

In S322, the plurality of brain predictions, which has N*K brain predictions, is compared with a brain activity measurement that was made at the same acquisition time as the predictions were made. For example, the brain activity measurement for the current time period can be compared with the N*K brain predictions made for the current time period. The brain activity measurement can comprise L brain measurements, or L voxel measurements comprising responses from L different voxels of a brain, each voxel eliciting a different measurement. Each brain prediction is scored upon taking a linear function (e.g., an inner product) of the differences between L voxels of brain activity measurement (i.e., L candidate response values) of the brain prediction and true voxel responses (i.e., L voxel measurements) of the brain measurement, thereby determining N*K scores. The score may be determined by measuring the distance between the predicted response values and the true response values. Once the N*K scores are determined for the entire N*K plurality of brain predictions, then the best N brain predictions, or N continuations, are identified from the N*K brain measurements that were scored.

The best N brain predictions are narrowed down from the list of N*K brain predictions. The best N*K brain predictions are narrowed down in order to prevent combinatorial explosion of hypotheses. If K new continuation words are added to each of N hypotheses and the N*K sequences of words are not narrowed down, then there would be an exponential growth of K sequences of words for every cycle, making each new sequence completely intractable due to its sheer size.

The step S322 is illustrated in FIG. 4 by a plurality of brain predictions 418. The plurality of brain predictions 418 are made for N*K continuations, and the plurality of brain predictions 418 is compared with brain measurements 408 that were measured at the same acquisition time. Each prediction in the plurality of brain predictions 418 and the brain measurement are then compared to give a score. The scores are then sorted to choose the best N predicted images.

In S324, the N brain predictions, or the sequences of words, are fed back to the hypothesis beam 306. This is also represented in 420. Notice that the size of the hypothesis beam 306 does not change, as it will always retain N sequences of words. This process gets repeated until the last brain measurement, or the end of the stimulus 302. Once the process ends, the best hypothesis containing a series of words among the list of N hypotheses in the hypothesis beam 306 will be selected. The selected hypothesis would be the final prediction of the stimulus 302.

III. Methods

A computer system can train an encoding model and use the encoding model to reconstruct a language, or a series of words, from non-invasive brain activity recordings. The computer can train the encoding model through a supervised learning that trains encoding model to predict brain activity measurements of a stimulus. Upon training the encoding model, the computer system can translate brain measurements, or images, of a subject (user) into the language using the trained encoding model.

A. Training Encoding Model

The computer system can receive a stimulus comprising sequences of words. Each sequence of words in sequences of words can be associated with one acquisition time (i.e., one time period). The computer system can annotate each word in the sequence of words with time labels. For example, if the sequence of words is “I have a dog”, then the annotating entity 106 may label times of each word in the sequence. The computer system can annotate the sequence of words with time labels by using a speech recognition software or a human annotator.

The computer system can use a neural language model to transform the sequence of words into a set of word embeddings vectors. Each word in the sequence of words can go through a quantitative feature transformation that change each word in the sequence of words into a word embeddings vector. Each word embeddings vector of the word can represent a semantic or syntax of the word.

The computer system can then determine a final word embedding vector using the word embeddings vector. The computer system can determine the final word embedding vector by down sampling the set of word embeddings vectors to produce an averaged word embedding vector. For example, if a sequence of words is “I have a dog”, the four word embedding vectors for the sequence of words “I have a dog” are averaged together to produce a single averaged word embedding vector. The computer system can applies a convolution kernel to the averaged word embedding vector and previous averaged word embedding vectors to produce a final word embedding vector. The convolution kernel is applied because a sequence of words doesn’t just have one immediate response. It has a response that evolves over time. A sequence of words can affect about the next 8 seconds of brain activity measurements, or 4 time periods for measurement using fMRI. For example, if a first sequence of words is “I have a dog”, then the sequence not only affects a first brain activity image made by the brain imaging device 206, but may affect a second, third, or fourth brain activity images The computer system can receive a brain activity measurement comprising L brain measurements by the brain imaging device. Each L brain measurement corresponds to a measurement of a different voxel of the brain. The brain measurement can be made by using the brain imaging device to measure at the time the subject is thinking, reading, or listening. The brain activity measurement can correspond to an acquisition time, or a time period.

The computer system, upon receiving the brain activity measurement and determining the final word embedding vector, can determine a linear mapping of the final word embedding vector into a voxel space of the brain activity measurement comprising L brain measurements to determine an encoding model. The linear mapping can be determined by using a linear regression that predicts how the final word embedding vector affects brain responses by fitting each feature of the vector into the brain activity measurement of voxels.

Brain activity measurements and final word embedding vectors can be determined for all time periods and can be compared to determine the linear mapping and train the encoding model. A brain activity measurement can be compared with a final word embedding vector corresponding to its time period.

B. Reconstructing a Language

Figure 5:
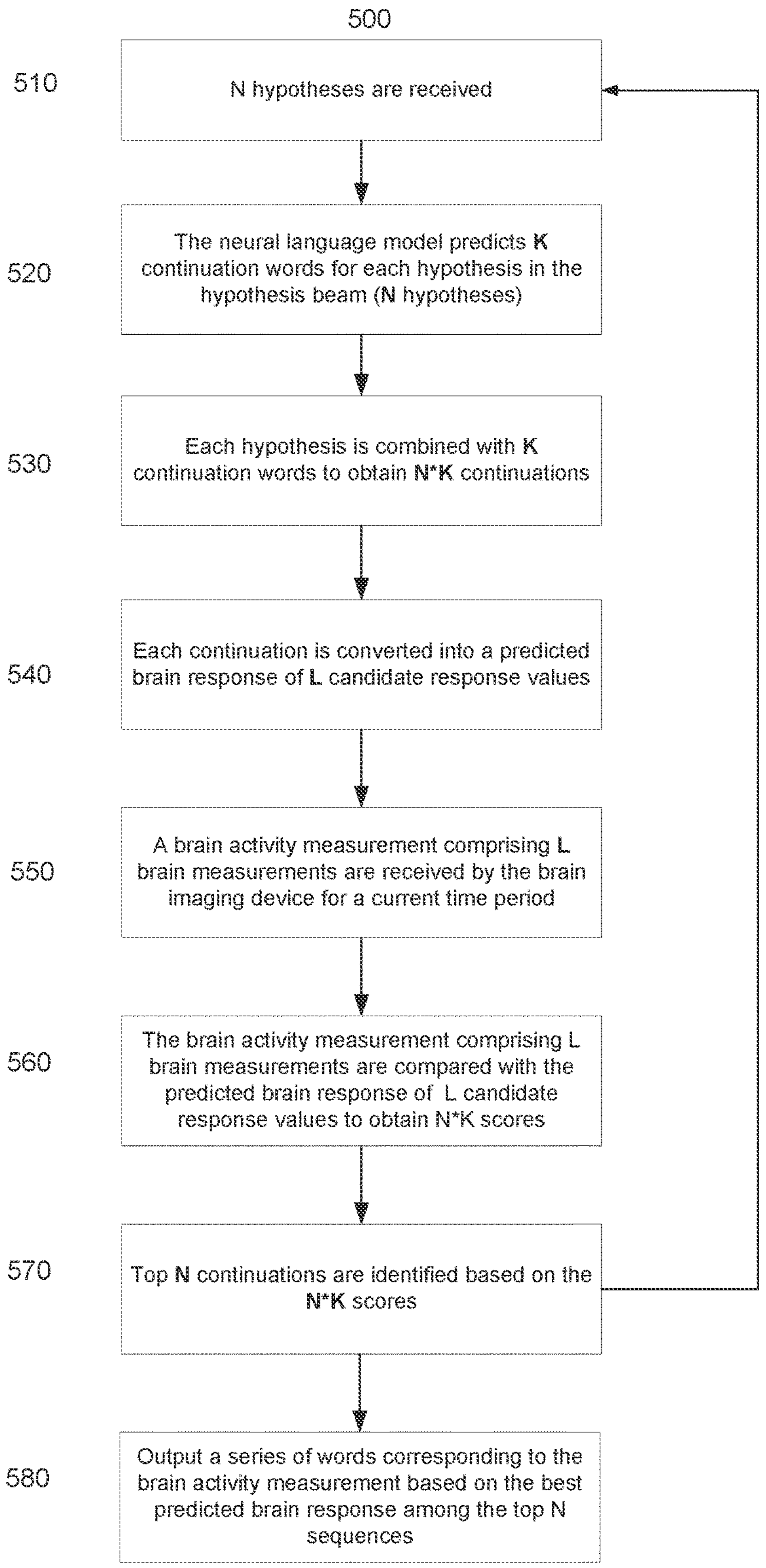
FIG. 5 provides a flowchart of a method of performing language reconstruction that results in a prediction of continuous language.

FIG. 5 shows a flowchart of a method by the computer system of reconstructing a language from a non-invasive brain recordings. The method comprises steps 510 to 580.

Step 510 comprises receiving updated N hypotheses, in which each hypothesis is composed of a sequence of words that is best predicted until the current time period. Each hypothesis can include a same number of words. The N hypotheses are N best combined sequences of words in the current model. For example, if the actual words in the stimulus is “I walked a dog to the park outside during afternoon”, then it may be the case that in the current time period of reconstructing the language, it may have only reconstructed language until “I walked a dog”, and N hypotheses may contain “I walked a cat”, I walked many dogs”, “I ran with dogs”, where each hypothesis is the best sequence of words reconstructed at the time period.

Step 520 comprises predicting K continuation words for each hypothesis in the hypothesis beam (N hypotheses) by the neural language model. For example, if the hypothesis contains words such as “I ran”, then the possible K continuation words may be “over”, “my”, and “fast”. The K continuation words are the best predicted words specific to their parent hypothesis. For example, if two hypotheses are “I ran” and “I ate”, then the continuations words for the first hypothesis may be “over”, “my”, and etc. while the continuation words for the second hypothesis may be “burgers”, “food”, and etc. Therefore, the K continuation words are unique to each parent hypothesis. This step is similar to S318 in FIG. 3.

Step 530 comprises combining K continuation words with N hypotheses to produce N*K continuations. A continuation may be a combination of a hypothesis and a continuation word. Each continuation is divided according to different sequences based on the predicted word times assigned by the word rate decoder, and each sequence is transformed into a set of word embedding vectors. The word embedding vectors in each sequence are averaged out to produce one averaged word embedding vector per sequence. A final word embedding vector for a current sequence is then determined by using a predetermined convolution kernel to assign different coefficients for each of the four previous sequences of averaged word embeddings. The final word embedding vector may be used to predict brain responses. Detailed descriptions of the transformation are under section II. C.

Step 540 comprises converting each continuation, or final word embedding vector, into a predicted brain response of L candidate values. The encoding model that was trained prior to the time of language reconstruction is used to map the continuation, or the final word embedding vector, into a predicted brain response. The encoding model maps different features of the final word embedding vector into candidate values of the predicted brain response. The predicted brain response has L candidate values, where each candidate response value corresponds to a measurement of a different part, or voxel, of the brain or to a different sensor measuring the different parts.

Step 550 comprises receiving a brain activity measurement comprising L brain measurements by the brain imaging device for a current time period, or a current sequence. Each L brain measurement corresponds to a measurement of a different voxel of the brain. The brain measurement can be made by using the brain imaging device to measure at the time the subject is thinking, reading, or listening. The L brain measurements are made for every acquisition time, or every sequence. Each L brain measurement maps to each predicted brain response of L candidate value, which are calculated using a final word embedding vector.

Step 560 comprises comparing the brain activity measurement comprising the L brain measurements by the predicted brain response of L candidate values of the N*K predicted brain responses. Each predicted brain response in N*K predicted brain responses is compared with the brain activity measurement made by the brain imaging device in step 550, and scored based on how similar it is to the brain activity measurement. Once the N*K scores for N*K predicted brain responses, or continuations, are determined, the N*K scores are ranked according to how similar each continuation is. Continuations can be ranked according to their similarity scores.

Step 570 comprises of identifying the top N continuations based on the ranked N*K scores. If there are more brain measurements that the language reconstruction model needs to reconstruct, then the top N continuations selected goes back to step 510 to start from the beginning of receiving the N hypotheses. If there are no more measurements to be reconstructed, then it goes to step 580.

Step 580 comprises of outputting a series of words corresponding to the brain activity measurement based on choosing the best predicted brain response among the top N sequences. The chosen predicted brain response would be the final prediction made by the model to predict the best continuation language for brain measurements made by the brain imaging device.

IV. Model Performance

Performance of the language decoder can be analyzed through different assessments, tests, and features to determine how the decoded series of words match with stimulus.

A. Decoder Parameters

The language decoder can have several parameters that can affect model performance. The beam search algorithm can be parameterized by the beam width k. The encoding model can be parameterized by the number of context words provided when extracting GPT embeddings. The noise model can be parameterized by a shrinkage factor $\alpha$ that regularizes the covariance $\Sigma$. Language model parameters include the length of the input context, the nucleus mass p and ratio r, and the set of possible output words.

In preliminary analyses decoding performance can be increased with the beam width but plateaued after k=200. Therefore, a beam width of 200 sequences can be used for analyses. All other parameters can be tuned by grid search and by hand on data collected as a subject can listen to a calibration story separate from the training and test stories (e.g., "From Boyhood to Fatherhood" by Jonathan Ames from *The Moth Radio Hour*). The calibration story can be decoded using each configuration of parameters. The best performing parameter values can be validated and adjusted through qualitative analysis of decoder predictions. The parameters that had the largest effect on decoding performance can be the nucleus ratio r and the noise model shrinkage $\alpha$. Setting r to be too small can make the decoder less linguistically coherent, while setting r to be too large can make the decoder less semantically correct. Setting $\alpha$ to be too small can overestimate the actual noise covariance, while setting $\alpha$ to be too large underestimates the actual noise covariance; both make the decoder less semantically correct. The parameter values used in this study can provide a default decoder configuration, but in practice can be tuned separately and continually for each subject to improve performance.

To ensure that the results generalize to new subjects and stimuli, all pilot analyses to data collected can be restricted as the subject listened to the test story. All pilot analyses on the test story can be qualitative. Analysis pipeline can be frozen before any results are reviewed for the remaining subjects, stimuli, and experiments.

B. Language Similarity Metrics

Decoded word sequences can be compared to reference word sequences using a range of automated metrics for evaluating language similarity. Word error rate (WER) computes the number of edits (word insertions, deletions, or substitutions) required to change the predicted sequence into the reference sequence. Bilingual evaluation understudy (BLEU) computes the number of predicted n-grams that occur in the reference sequence (precision). The unigram variant BLEU-1 can be used. Metric for evaluation of transaction with explicit ordering (METEOR) combines the number of predicted unigrams that occur in the reference sequence (precision) with the number of reference unigrams that occur in the predicted sequence (recall), and accounts for synonymy and stemming using external databases. Bidirectional encoder representations from transformer score (BERTScore) uses a bidirectional transformer language model to represent each word in the predicted and reference sequences as a contextualized embedding, and then computes a matching score over the predicted and reference embeddings. BERTScore can be used for all analyses where the language similarity metric is not specified.

For the perceived speech, multi-speaker, and decoder resistance experiments, stimulus transcripts can be used as reference sequences. For the imagined speech experiment, subjects can be instructed to tell each story segment out loud outside of the scanner, and the audio was recorded and manually transcribed to provide reference sequences. For the perceived movie experiment, Audio descriptions can be manually transcribed to provide reference sequence. To compare word sequences decoded from different cortical regions (808 of FIG. 8A), each sequence was scored using the other as reference and the scores were averaged (prediction similarity).

Predicted and reference words within a 20 s window can be scored around every second of the stimulus (window similarity). Scores can be averaged across windows to quantify how well the decoder predicted the full stimulus (story similarity).

To estimate a ceiling for each metric, perceived speech test story (e.g., "Where There's Smoke") can be translated into Mandarin Chinese by a professional translator. The translator was instructed to preserve all of the details of the story in the correct order. The story was then translated back into English using a state-of-the-art machine translation system. The similarity between the original story words and the output of the machine translation system can then be scored. These scores provide a ceiling for decoding performance, since modern machine translation systems can be trained on large amounts of paired data and the Mandarin Chinese translation contains virtually the same information as the original story words.

To test whether perceived speech time-points can be identified using decoder predictions, a post hoc identification analysis using similarity scores between the predicted and reference sequences can be performed. A matrix M where $M_{ij}$ reflecting the similarity between the ith predicted window and the jth reference window can be constructed. For each time-point i, all of the reference windows by their similarity to the ith predicted window sorted, and the time-point by the percentile rank of the ith reference window can be scored. The mean percentile rank for the full stimulus can be obtained by averaging percentile ranks across time-points.

To test whether imagined speech scans can be identified using decoder predictions, a post hoc identification analysis using similarity scores between the predicted and reference sequences can be performed. For each scan, the similarity scores between the decoder prediction and the five reference transcripts can be normalized into probabilities. Top-1 accuracy can be computed by assessing whether the decoder prediction for each scan was most similar to the correct transcript. The 100% top-1 accuracy for each subject can be observed. Cross-entropy for each scan by taking the negative logarithm (base 2) of the probability of the correct transcript can be computed. A mean cross-entropy of 0.25-0.82 bits can be observed. A perfect decoder would have a cross-entropy of 0 bits and a chance-level decoder would have a cross-entropy of $\log_2(5)=2.32$ bits.

C. Statistical Testing

To test statistical significance of the word rate model (i.e., word-time decoder), the linear correlation between the predicted and the actual word rate vectors across a test story can be computed, and 2,000 null correlations by randomly shuffling 10-TR segments of the actual word rate vector can be generated. The observed linear correlation to the null distribution using a one-sided permutation test can be compared; p-values were computed as the fraction of shuffles with a linear correlation greater than or equal to than the observed linear correlation.

To test statistical significance of the decoding scores, null sequences can be generated by sampling from the language model without using any brain data except to predict word times. The word rate model and the decoding scores can be separately evaluated because the language similarity metrics used to compute the decoding scores are affected by the number of words in the predicted sequences. By generating null sequences with the same word times as the predicted sequence, the test isolates the ability of the decoder to extract semantic information from the brain data. To generate null sequences, same beam search procedure can be followed as the actual language decoder. The null model maintains a beam of 10 candidate sequences and generates continuations from the language model nucleus at each predicted word time. The only difference between the actual decoder and the null model is that instead of ranking the continuations by the likelihood of the fMRI data, the null model randomly assigns a likelihood to each continuation. After iterating through all of the predicted word times, the null model outputs the candidate sequence with the highest likelihood. This process can be repeated 200 times to generate 200 null sequences. This process is as similar as possible to the actual decoder without using any brain data to select words, so these sequences reflect the null hypothesis that the decoder does not recover meaningful information about the stimulus from the brain data. The null sequences against the reference sequence can be scored to produce a null distribution of decoding scores. The observed decoding scores to this null distribution using a one-sided nonparametric test can be scored; p-values were computed as the fraction of null sequences with a decoding score greater than or equal to the observed decoding score.

To check that the null scores are not trivially low, the similarity scores between the reference sequence and the 200 null sequences can be compared to the similarity scores between the reference sequence and the transcripts of 62 other narrative stories. The mean similarity between the reference sequence and the null sequences was discovered to be higher than the mean similarity between the reference sequence and the other story transcripts, indicating that the null scores are not trivially low.

To test statistical significance of the post hoc identification analysis, 10-row blocks of the similarity matrix M can be randomly shuffled before computing mean percentile ranks. 2,000 shuffles can be evaluated to obtain a null distribution of mean percentile ranks. The observed mean percentile rank can be compared to this null distribution using a one-sided permutation test; p-values were computed as the fraction of shuffles with a mean percentile rank greater than or equal to than the observed mean percentile rank.

Figure 9A:
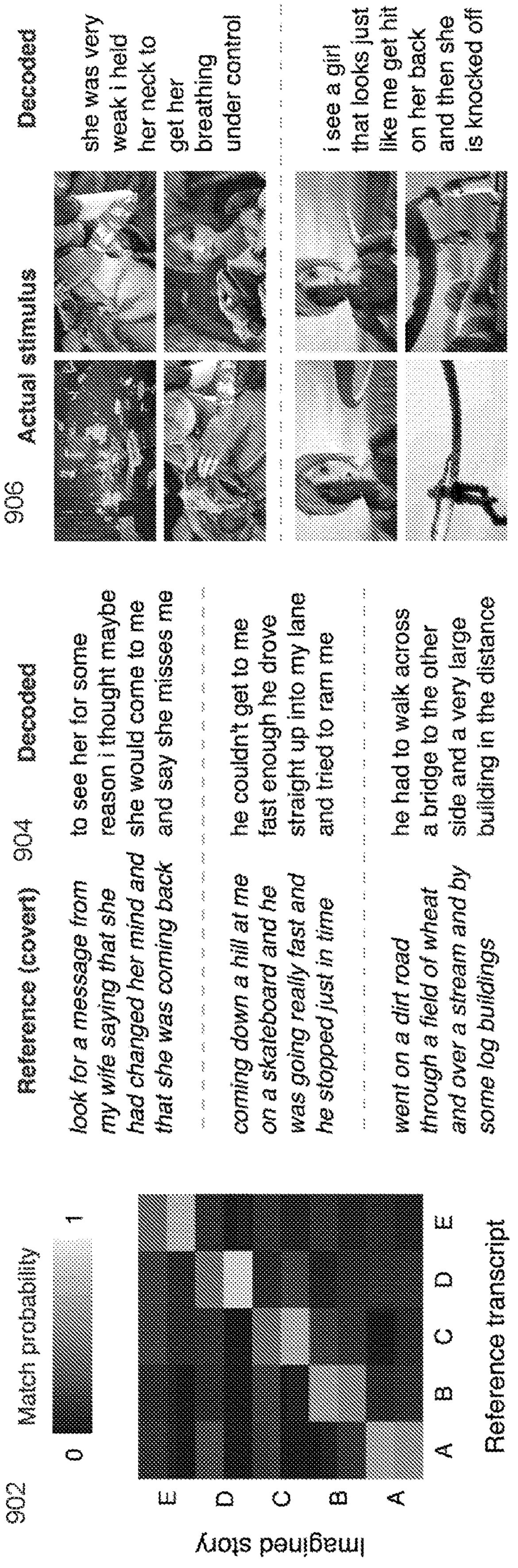
FIGS. 9A and 9B provide language decoder applications and privacy implications.
Figure 9B:
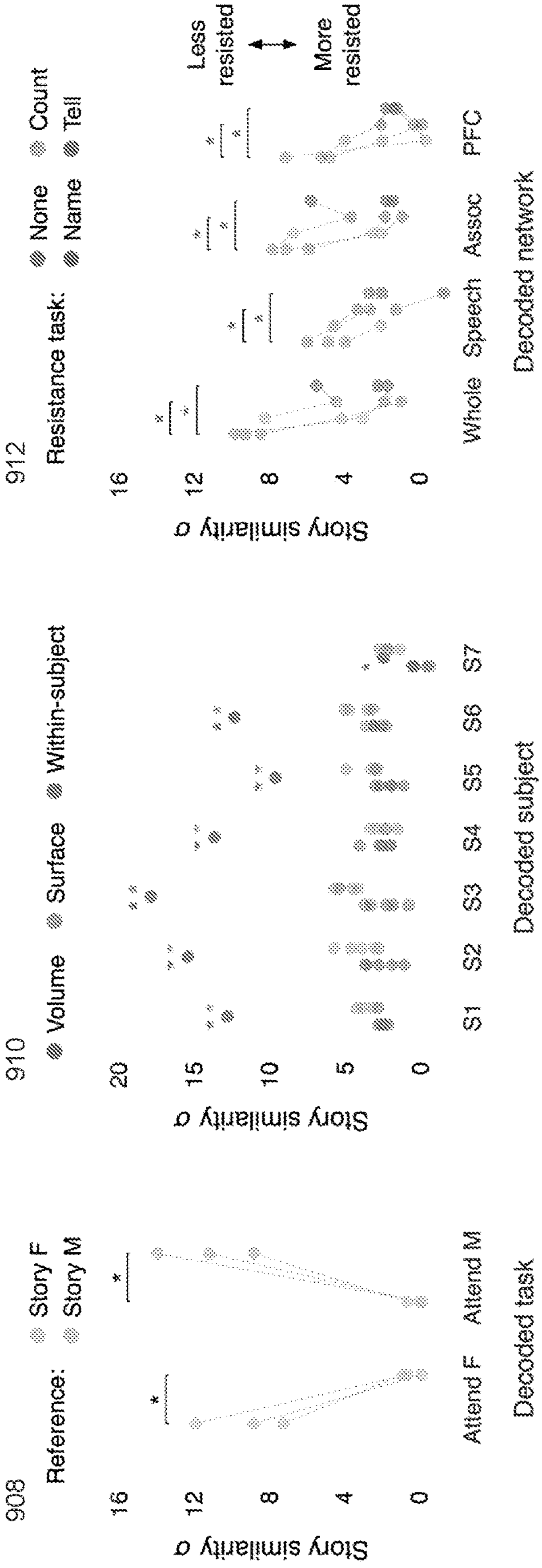

Unless otherwise stated, all tests can be performed within each subject and then replicated across all subjects (n=7 for the cross-subject decoding analysis shown in 910 of FIG. 9B, n=3 for all other analyses). All tests can be corrected for multiple comparisons when necessary using the false discovery rate (FDR). The range across subjects was reported for all quantitative results.

D. Behavioral Comprehension Assessment

Figure 13A:
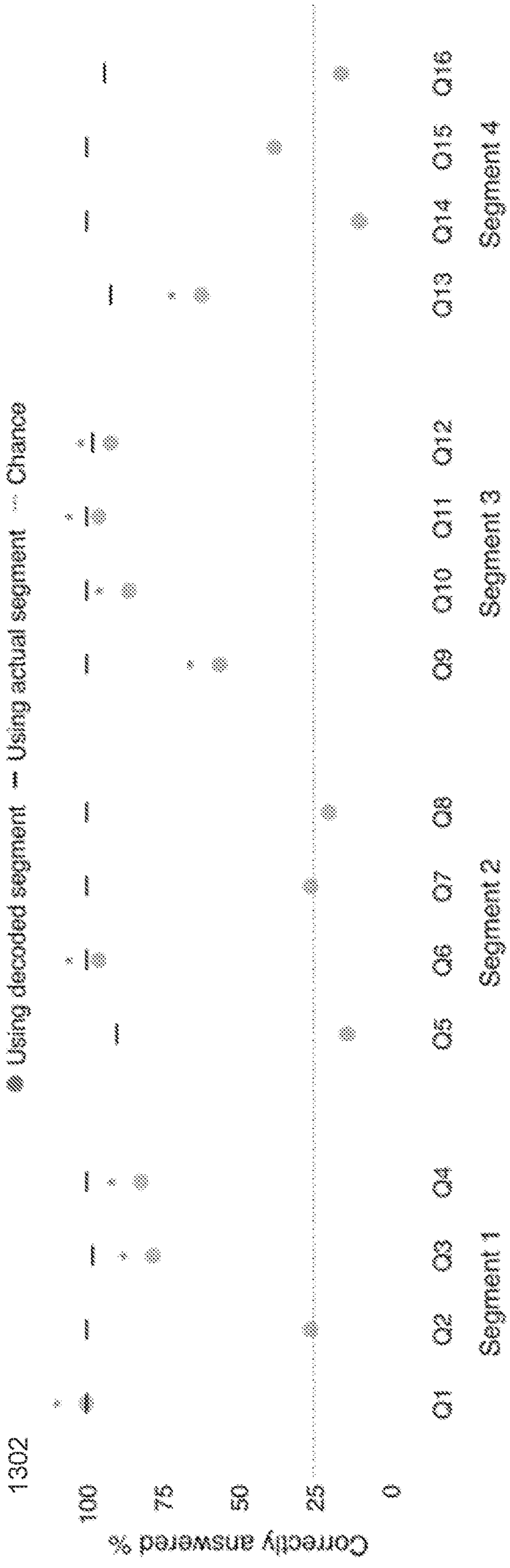

To assess the intelligibility of decoder predictions, an online behavioral experiment to test whether other people could answer multiple-choice questions about a stimulus story using just a subject's decoder predictions can be conducted (FIGS. 13A and 13B). Four 80 s segments of the perceived speech test story can be chosen on the basis of being relatively self-contained. For each segment four multiple-choice questions about the actual stimulus can be wrote without looking at the decoder predictions. To further ensure that the questions were not biased toward the decoder predictions, the multiple-choice answers were written by a separate researcher who had never seen the decoder predictions.

The experiment was presented as a Qualtrics questionnaire. 100 online subjects over Prolific (50 female, 49 male, 1 non-binary) and randomly assigned them to experimental and control groups can be recruited. For each segment, the experimental group subjects were shown the decoded words from subject, while the control group subjects were shown the actual stimulus words. The words for each segment and the corresponding multiple-choice questions were shown together on a single page of the Qualtrics questionnaire. Segments were shown in story order. Back button functionality was disabled, so subjects were not allowed to change their answers for previous segments after seeing a new segment. The experimental protocol was approved by the Institutional Review Board at the University of Texas at Austin. Informed consent was obtained from all subjects.

E. Sources of Decoding Error

To test if decoding performance is limited by the size of the training dataset, decoders can be trained on different amounts of data. Decoding scores appeared to linearly increase each time the size of the training dataset was doubled. To test if the diminishing returns of adding training data are due to the fact that decoders were trained on overlapping samples of data, a simulation to compare how decoders would perform when trained on non-overlapping and overlapping samples of data was used. The actual encoding model and the actual noise model to simulate brain responses to 36 sessions of training stories are also used. Non-overlapping samples of 3, 7, 11, and 15 sessions by taking sessions 1 through 3, 4 through 10, 11 through 21, and 22 through 36 have been obtained. Overlapping samples of 3, 7, 11, and 15 sessions by taking sessions 1 through 3, 1 through 7, 1 through 11, and 1 through 15 have been obtained. Decoders on these simulated datasets can be trained, and the relationship between decoding scores and the number of training sessions was found to be very similar for the non-overlapping and overlapping datasets (FIG. 11) This suggests that the observed diminishing returns of adding training data are not due to the fact that decoders were trained on overlapping samples of data.

Figure 18:
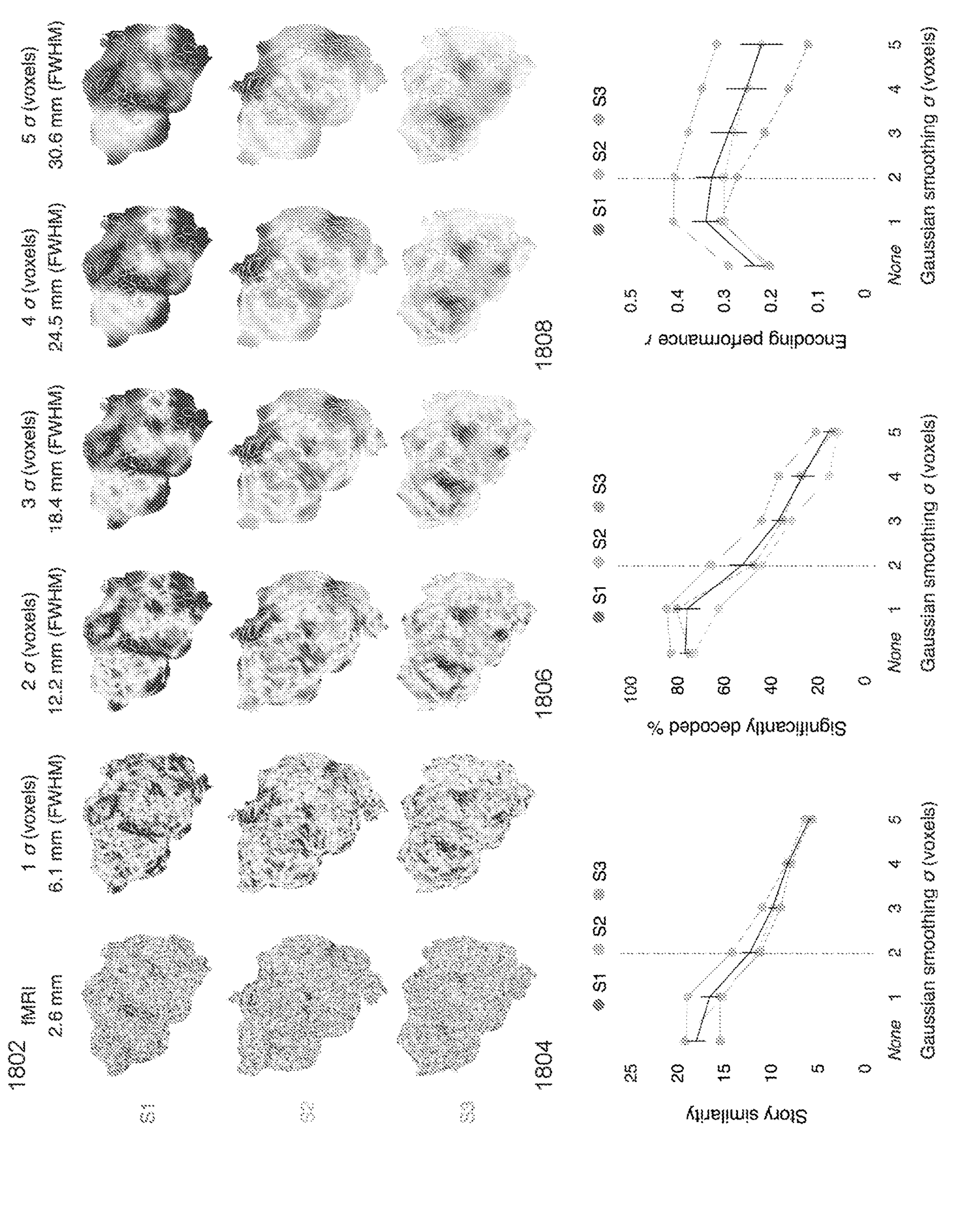
FIG. 18 provides analysis results of decoding performance at lower spatial resolutions.

To test if decoding performance relies on the high spatial resolution of fMRI, the fMRI data can be spatially smoothed by convolving each image with a three-dimensional Gaussian kernel (FIG. 18). Gaussian kernels with standard deviations of 1, 2, 3, 4, and 5 voxels, corresponding to 6.1, 12.2, 18.4, 24.5, and 30.6 mm full width at half maximum (FWHM) can be tested. The encoding model, noise model, and word rate model are estimated on spatially smoothed perceived speech training data, and the decoder on spatially smoothed perceived speech test data are evaluated.

To test if decoding performance is limited by noise in the test data, the signal-to-noise ratio of the test responses have been artificially raised by averaging across repeats of a test story.

To test if decoding performance is limited by model misspecification, the word-level decoding performance can be quantified by representing words using 300-dimensional GloVe embeddings. A 10 s window centered around each stimulus word was considered. The maximum linear correlation between the stimulus word and the predicted words in the window were computed. Then, for each of the 200 null sequences, the maximum linear correlation between the stimulus word and the null words in the window were computed. The match score for the stimulus word was defined as the number of null sequences with a maximum correlation less than the maximum correlation of the predicted sequence. Match scores above 100 indicate higher decoding performance than expected by chance, while match scores below 100 indicate lower decoding performance than expected by chance. Match scores were averaged across all occurrences of a word in six test stories. The word-level match scores were compared to behavioral ratings of valence (pleasantness), arousal (intensity of emotion), dominance (degree of exerted control), and concreteness (degree of sensory or motor experience). Each set of behavioral ratings was linearly rescaled to be between 0 and 1. The word-level match scores were also compared to word duration in the test dataset, language model probability in the test dataset (which corresponds to the information conveyed by a word), word frequency in the test dataset, and word frequency in the training dataset.

F. Decoder Ablations

Figure 19:
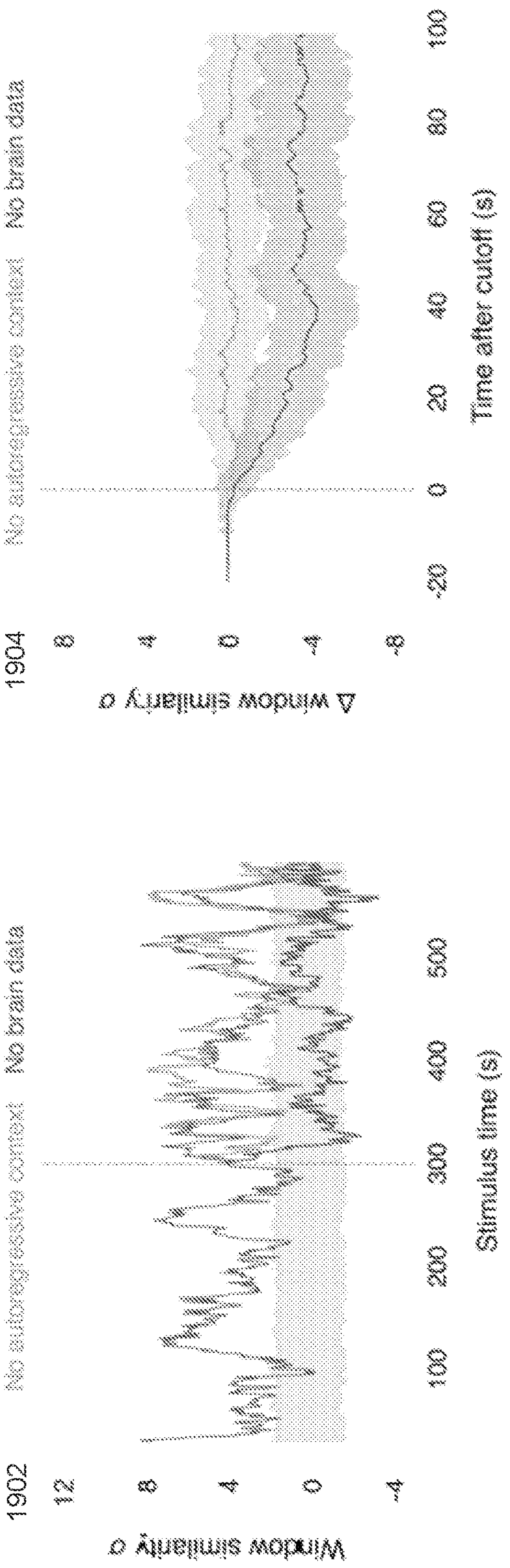
FIG. 19 provides analysis results of decoder ablations.

When the word rate model (i.e., word-time decoder) detects new words, the language model proposes continuations using the previously predicted words as autoregressive context, and the encoding model ranks the continuations using the fMRI data. To understand the relative contributions of the autoregressive context and the fMRI data to decoding performance, decoders on perceived speech data in the absence of each component can be evaluated (FIG. 19). The standard decoding approach up to a cutoff point in the perceived speech test story was performed. After the cutoff, either the autoregressive context was reset or the fMRI data was removed. To reset the autoregressive context, all of the candidate sequences was discarded, and the beam with an empty sequence was re-initialized. The standard decoding approach for the remainder of the scan was then performed. To remove the fMRI data, random likelihoods was assigned (rather than encoding model likelihoods) to continuations for the remainder of the scan.

G. Isolated Encoding Model and Language Model Scores

Figure 20:
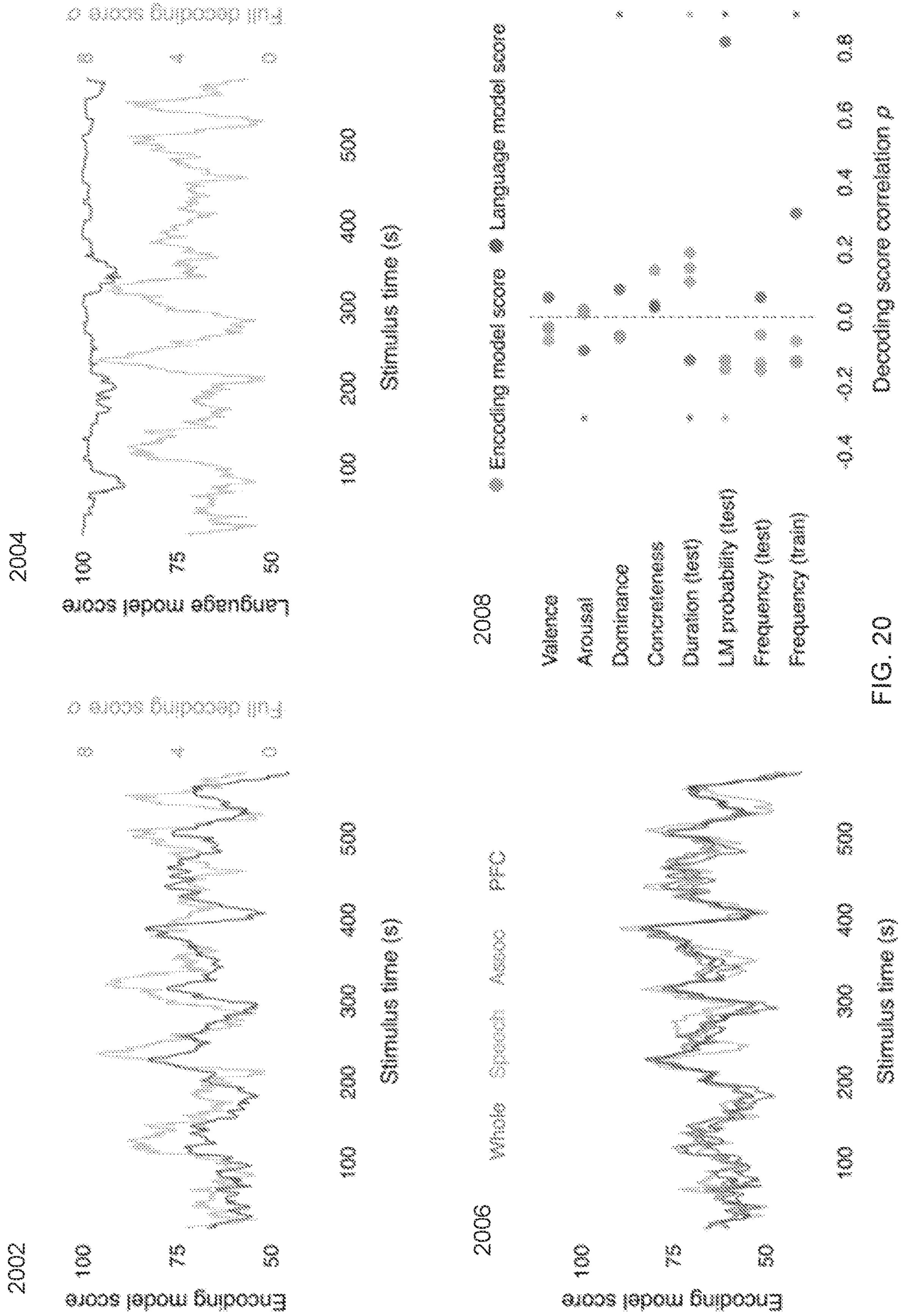
FIG. 20 provides analysis results of isolated encoding model and language model scores.

In practice, the decoder uses the previously predicted words to predict the next word. This use of autoregressive context causes errors to propagate between the encoding model and the language model, making it difficult to attribute errors to one component or the other. To isolate errors introduced by each component, the decoder components can be separately evaluated on the perceived speech test story using the actual—rather than the predicted—stimulus words as context (FIG. 20). At each word time t, the encoding model and the language model can be provided with the actual stimulus word as well as 100 randomly sampled distractor words.

To evaluate how well the word at time t can be decoded using the encoding model, the encoding model can be used to rank the actual stimulus word and the 100 distractor words based on the likelihood of the recorded responses. An isolated encoding model score can be computed based on the number of distractor words ranked below the actual word. Since the encoding model scores are independent from errors in the language model and the autoregressive context, they provide a ceiling for how well each word can be decoded from the fMRI data.

To evaluate how well the word at time t can be generated using the language model, the language model can be used to rank the actual stimulus word and the 100 distractor words based on their probability given the previous stimulus words. An isolated language model score can be computed based on the number of distractor words ranked below the actual word. Since the language model scores are independent from errors in the encoding model and the autoregressive context, they provide a ceiling for how well each word can be generated by the language model.

For both the isolated encoding model and the language model scores, 100 indicates perfect performance and 50 indicates chance level performance. The isolated encoding model and language scores were computed for each word. To compare against the full decoding scores from 610 of FIG. 6B, the word-level scores were averaged across 20 s windows of the stimulus.

H. Anatomical Alignment

To test if decoders could be estimated without any training data from a target subject, volumetric and surface-based methods were used to anatomically align training data from separate source subjects into the volumetric space of the target subject.

For volumetric alignment, the get_mnixfm function can be used in a computer function (e.g., pycortex) to compute a linear map from the volumetric space of each source subject to the MNI template space. This map was applied to recorded brain responses for each training story using the transform_to_mni function in pycortex. The transform_mni_to_subject function can be then used in pycortex to map the responses in MNI152 space to the volumetric space of the target subject. The response time-course can be z-scored for each voxel in the volumetric space of the target subject.

For surface-based alignment, the get_mri_surf2surf_matrix function can be used in pycortex to compute a map from the surface vertices of each source subject to the surface vertices of the target subject. This map was applied to the recorded brain responses for each training story. The surface vertices can then be mapped of the target subject into the volumetric space of the target subject using the line-nearest scheme in pycortex. The response time-course can be z-scored for each voxel in the volumetric space of the target subject.

A bootstrap procedure can be used to sample five sets of source subjects for the target subject. Each source subject independently produced aligned responses for the target subject. To estimate the encoding model and word rate model, the aligned responses can be averaged across the source subjects. For the word rate model, the speech network of the target subject can be localized by anatomically aligning the speech networks of the source subjects. To estimate the noise model $\Sigma$, aligned responses from a single, randomly sampled source subject can be used to compute the bootstrap noise covariance matrix for each held out training story. The cross-subject decoders were evaluated on actual responses recorded from the target subject.

V. Results

Figure 10:
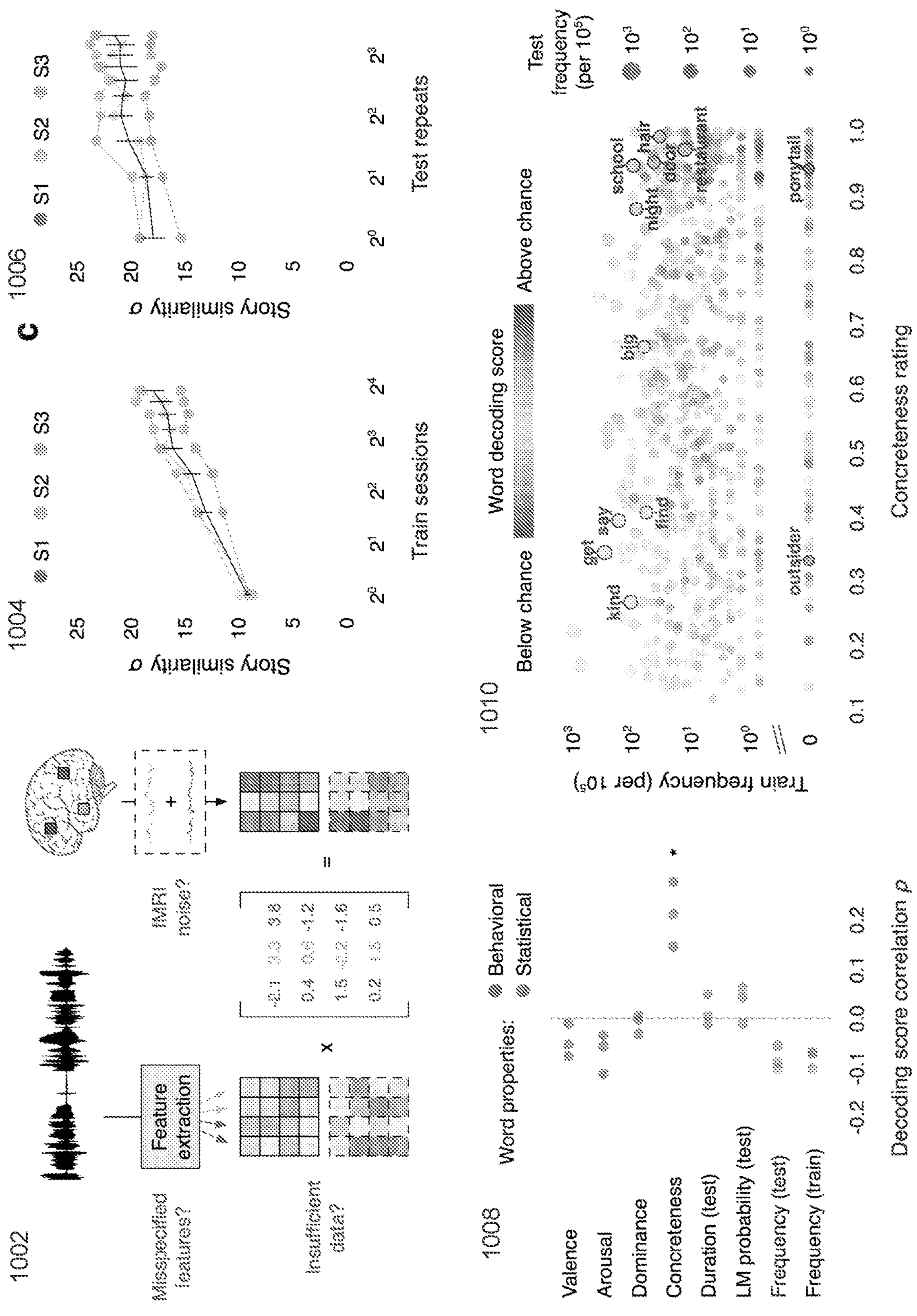
FIG. 10 provides analysis results of sources of decoding errors.

FIGS. 6-10 are results illustrating embodiments of the invention. FIGS. 6A, 6B, and 7 show results of decoded language generated using a language decoder, FIGS. 8A and 8B show decoding across different cortical regions, FIGS. 9A and 9B show applications of the language decoder and privacy implications, and FIG. 10 shows sources of possible decoding errors.

A. Language Decoder Results

The language decoder was trained for three subjects, and each subject's decoder was evaluated on separate, single-trial brain responses that were recorded while the subject listened to novel test stories that were not used for model training. Since the language decoder represents language using semantic features rather than motor or auditory features, the language decoder predictions should capture the meaning of the stimuli. Results show that the decoded word sequences captured not only the meaning of the stimuli, but often even exact words and phrases, demonstrating that fine-grained semantic information can be recovered from the BOLD signal (see 606 of FIG. 6A and FIG. 7).

To quantify decoding performance, decoded and actual word sequences can be compared for one test story (1,839 words) using several language similarity metrics. Standard metrics like word error rate (WER), bilingual evaluation understudy (BLEU), metric for evaluation of transaction with explicit ordering (METEOR) measure the number of words shared by two sequences. However, because different words can convey the same meaning—for instance "we were busy" and "we had a lot of work"—bidirectional encoder representations from transformer score (BERTScore), a newer method which uses machine learning to quantify whether two sequences share a meaning, has been used. Story decoding performance was significantly higher than expected by chance under each metric but particularly BERTScore (q(FDR)<0.05, one-sided nonparametric test; 608 of FIG. 6B; FIG. 7). Most time-points in the story (72-82%) had a significantly higher BERTScore than expected by chance (610 of FIG. 6B) and could be identified from other time-points (mean percentile rank=0.85-0.91) based on BERTScore similarities between the decoded and actual words (612 of FIG. 6B; 802 of FIG. 8A). Whether the decoded words captured the original meaning of the story using a behavioral experiment has also been tested, which showed that 9 of 16 reading comprehension questions could be answered by subjects who had only read the decoded words.

Figure 6A:
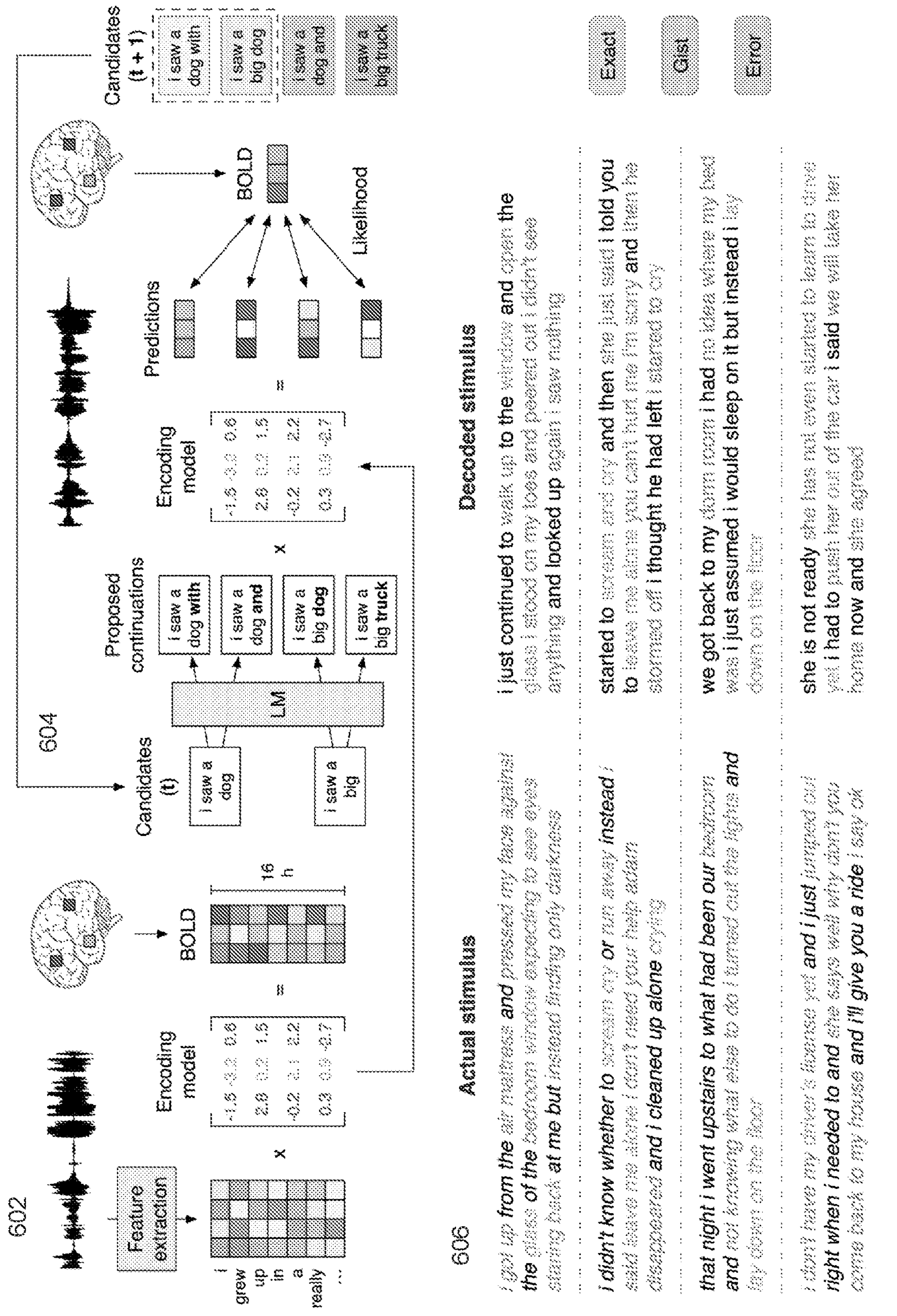
FIGS. 6A and 6B provide analysis results of predicted text by a language decoder.
Figure 6B:
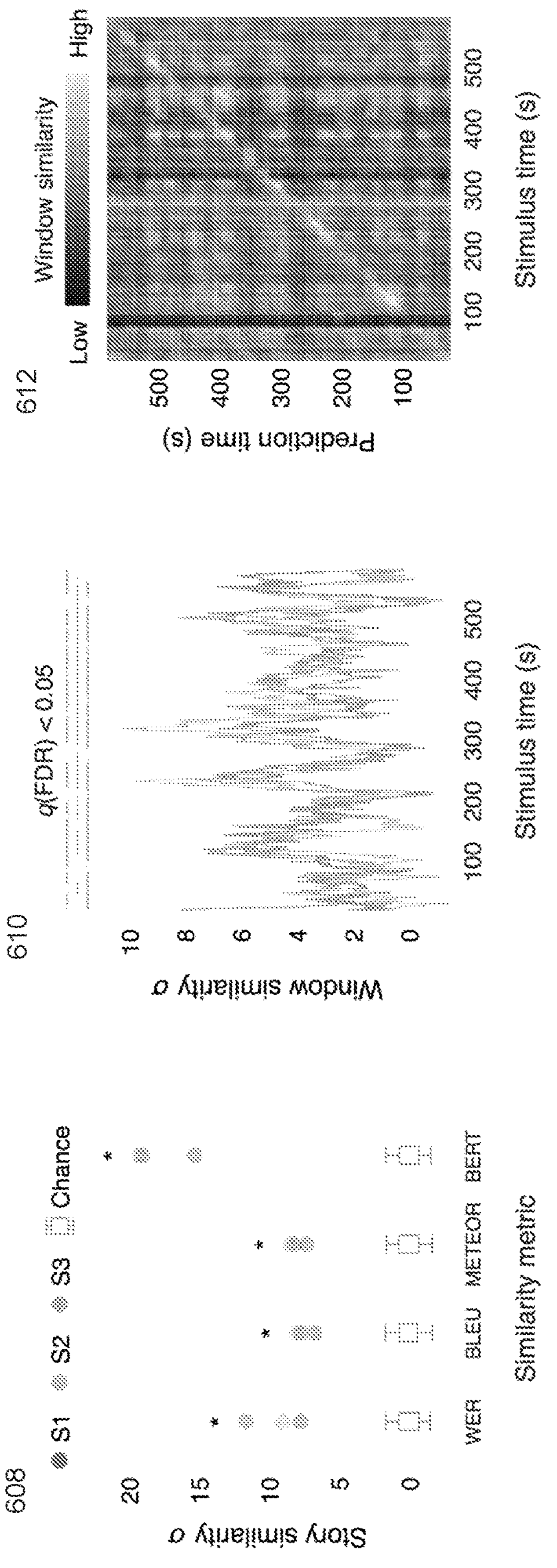

FIGS. 6A and 6B show analysis results of predicted segments made by a language decoder. It outlines results of different statistical tests done on the predicted segments, and analyzes the results of the tests.

In a model training of 602, brain oxygen level dependent (BOLD) responses were recorded using fMRI while subjects listened to spoken narrative stories. A language model (LM) was used to extract quantitative features for each stimulus word. Encoding models (EM) were estimated to predict BOLD responses from the word features.

In a language reconstruction of 604, to reconstruct language from novel brain recordings, the language decoder can maintain a set of candidate word sequences. When new words are detected, a language model (LM) proposes continuations for each sequence and the encoding model scores the likelihood of the recorded brain responses under each continuation. The most likely continuations can be retained.

In 606, decoders were evaluated on single-trial brain responses recorded while subjects listened to test stories that were not used for model training. Segments from four test stories can be shown alongside decoder predictions for one subject. Examples were manually selected and annotated to demonstrate typical language decoder behaviors. The language decoder exactly reproduces some words and phrases, and captures the gist of many more.

In 608, the language decoder predictions for a test story were significantly more similar to the actual stimulus words than expected by chance under a range of language similarity metrics (* indicates q(FDR)<0.05 for all subjects, one-sided nonparametric test). To compare across metrics, results are shown as standard deviations away from the mean of the null distribution (see Methods). Boxes indicate the interquartile range of the null distribution; whiskers indicate the 5th and 95th percentiles.

In 610, for most time points, decoding scores were significantly higher than expected by chance (q(FDR)<0.05, one-sided nonparametric test) under the BERTScore metric.

In 612, identification accuracy for one subject is shown. The color at (i, j) reflects the similarity between the ith second of the prediction and the jth second of the actual stimulus. Identification accuracy was significantly higher than expected by chance (p<0.05, one-sided permutation test).

FIG. 7 shows language similarity scores between the decoded words and actual word sequences using several language similarity metrics. Standard metrics such as word error rate (WER), bilingual evaluation understudy (BLEU), metric for evaluation of transaction with explicit ordering (METEOR), bidirectional encoder representations from transformer score (BERTScore) can be shown in the FIG. 7.

In FIG. 7, decoder predictions for a perceived story were compared to the actual stimulus words using a range of language similarity metrics. A floor for each metric was computed by scoring the mean similarity between the actual stimulus words and 200 null sequences generated from a language model without using any brain data. A ceiling for each metric was computed by manually translating the actual stimulus words into Mandarin Chinese, automatically translating the words back into English using a state-of-the-art machine translation system, and scoring the similarity between the actual stimulus words and the output of the machine translation system. Under the BERTScore metric, the decoder—which was trained on far less paired data and used far noisier input—performed around 20% as well as the machine translation system relative to the floor B. Decoding Across Cortical Regions The decoding results shown in FIGS. 6A and 6B used responses from multiple cortical regions to achieve good performance. The decoder can now be used to study how language is represented within each of these regions. While previous studies have demonstrated that most parts of cortex are active during language processing, it is unclear which regions represent language at the granularity of words and phrases, which regions are consistently engaged in language processing, and whether different regions encode complementary or redundant language representations. To answer these questions, brain data can be partitioned into three macroscale cortical regions previously shown to be active during language processing—the speech network, the parietal-temporal-occipital association region, and the prefrontal region—and separately decoded from each region in each hemisphere (802 of FIG. 8A; 1402 of FIG. 14).

To test whether a region encodes semantic information at the granularity of words and phrases, decoder predictions can be evaluated from the region using multiple language similarity metrics. Previous studies have decoded semantic features from BOLD responses in different regions, but the distributed nature of the semantic features and the low temporal resolution of the BOLD signal make it difficult to evaluate whether a region represents fine-grained words or coarser-grained categories. Since decoder produces interpretable word sequences, how precisely each region represents the stimulus words can be directly accessed (806 of FIG. 8A). Under the WER and BERTScore metrics, decoder predictions were significantly more similar to the actual stimulus words than expected by chance for all regions (q(FDR)<0.05, one-sided nonparametric test). Under the BLEU and METEOR metrics, decoder predictions were significantly more similar to the actual stimulus words than expected by chance for all regions except the right hemisphere speech network (q(FDR)<0.05, one-sided nonparametric test). These results demonstrate that multiple cortical regions represent language at the granularity of individual words and phrases.

While the previous analysis quantifies how well a region represents the stimulus as a whole, it does not specify whether the region is consistently engaged throughout the stimulus or only active at certain times. To identify regions that are consistently engaged in language processing, the fraction of time-points that were significantly decoded from each region can be computed. The result showed that most of the time-points that were significantly decoded from the whole brain could be separately decoded from the association (80-86%) and prefrontal (46-77%) regions (806 of FIG. 8A; 1404 of FIG. 14), suggesting that these regions consistently represent the meaning of words and phrases in language. Notably, only 28-59% of the time-points that were significantly decoded from the whole brain could be decoded from the speech network. This is likely a consequence of the decoding framework—the speech network is known to be consistently engaged in language processing, but it tends to represent lower-level articulatory and auditory features, while the language decoder operates on higher-level semantic features of entire word sequences.

Finally, relationship between language representations encoded in different regions can be assessed. One possible explanation for successful decoding from multiple regions is that different regions encode complementary representations—such as different parts of speech—in a modular organization. If this were the case, different aspects of the stimulus may be decodable from individual regions, but the full stimulus should only be decodable from the whole brain. Alternatively, different regions might encode redundant representations of the full stimulus. If this were the case, the same information may be separately decodable from multiple individual regions. To differentiate these possibilities, decoded word sequences across regions and hemispheres can be directly compared, and found that the similarity between each pair of predictions was significantly higher than expected by chance (q(FDR)<0.05, two-sided nonparametric test; 808 of FIG. 8A). This suggests that different cortical regions encode redundant word-level language representations. However, the same words could be encoded in different regions using different features.

The results demonstrate that the word sequences that can be decoded from the whole brain can also be consistently decoded from multiple individual regions (810 of FIG. 8B). A practical implication of this redundant coding is that future brain-computer interfaces may be able to attain good performance even while selectively recording from regions that are most accessible or intact.

Figure 8A:
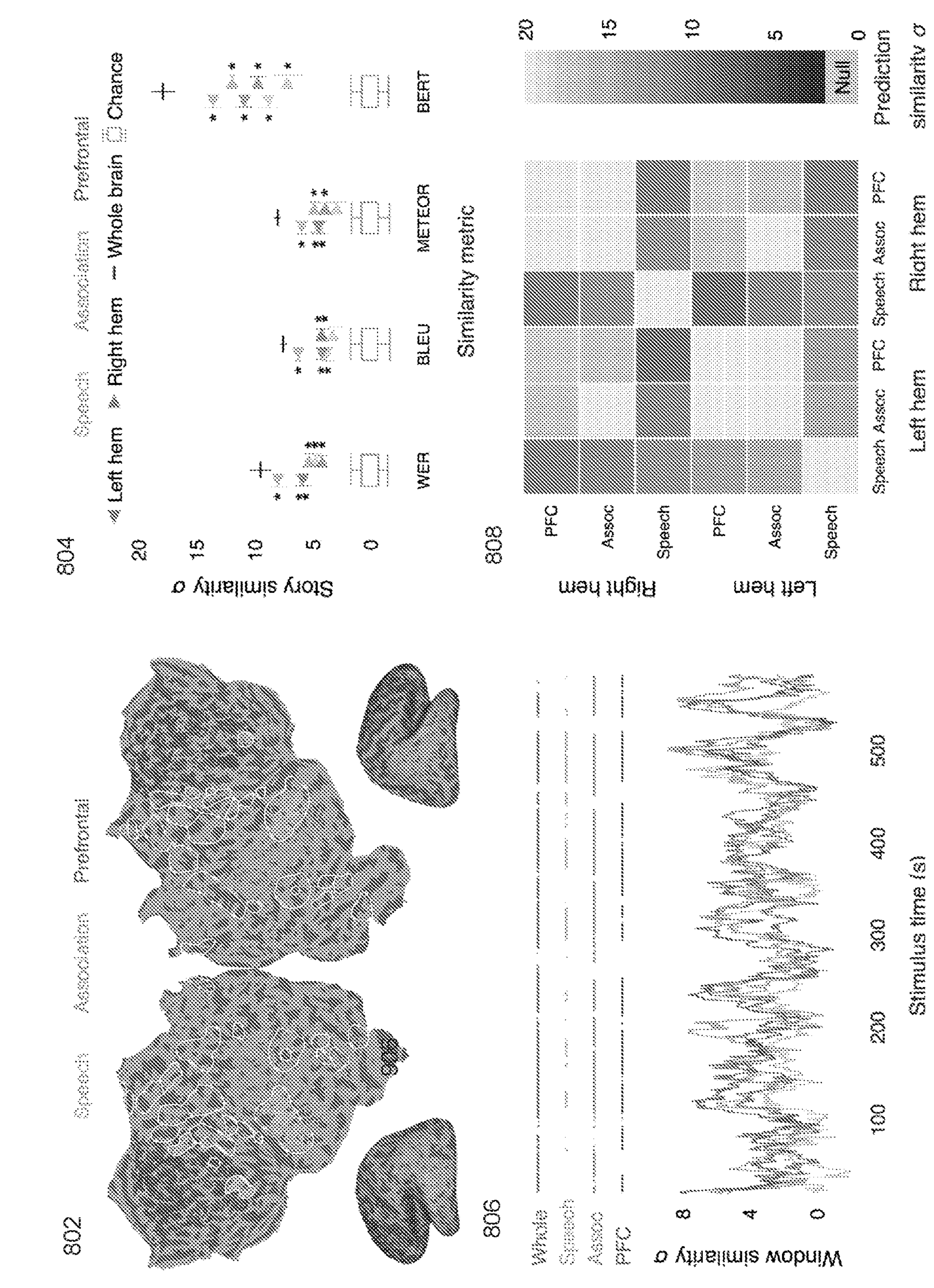

FIGS. 8A and 8B show analysis results of how language is represented across different cortex. It shows decoder predictions from different cortical language networks, and analyzes the predictions made by different cortical language networks.

In 802, partitioned brain data of three macroscale cortical networks are shown. Brain data were partitioned into the classically localized language network, the parietal-temporal-occipital association network, and the prefrontal network.

In 804, decoder predictions from each region in each hemisphere were significantly more similar to the actual stimulus words than expected by chance under most metrics (* indicates q(FDR)<0.05 for all subjects, one-sided nonparametric test). Error bars indicate the standard error of the mean (n=3 subjects). Boxes indicate the interquartile range of the null distribution; whiskers indicate the 5th and 95th percentiles.

In 806, decoding performance time-course from each region for one subject. Horizontal lines indicate when decoding performance was significantly higher than expected by chance under the BERTScore metric (q(FDR)<0.05, one-sided nonparametric test). Most of the time-points that were significantly decoded from the whole brain were also significantly decoded from the association and prefrontal regions.

In 808, decoder predictions were compared across regions. Decoded word sequences from each pair of regions were significantly more similar than expected by chance (q(FDR)<0.05, two-sided nonparametric test).

In 810, decoder predictions from each network in each hemisphere is shown. Predictions were similar across networks and captured the meaning of the stimulus.

A. Decoding Applications and Privacy Implications

In the previous analyses, the language decoders on brain responses to perceived speech were trained and tested. Next, to demonstrate the range of potential applications for the semantic language decoder, whether language decoders trained on brain responses to perceived speech could be used to decode brain responses to other tasks can be assessed.

1. Imagined Speech Decoding

A key task for brain-computer interfaces is decoding covert imagined speech in the absence of external stimuli. To test whether the language decoder can be used to decode imagined speech, subjects imagined telling five one-minute stories while being recorded with fMRI, and separately told the same stories outside of the scanner to provide reference transcripts. For each one-minute scan, the story that the subject was imagining can be correctly identified by decoding the scan, normalizing the similarity scores between the decoder prediction and the reference transcripts into probabilities, and choosing the most likely transcript (100% identification accuracy; 902 of FIG. 9A; 1204 of FIG. 12). Across stories, decoder predictions were significantly more similar to the corresponding transcripts than expected by chance (p<0.05, one-sided nonparametric test). Qualitative analysis shows that the decoder can recover the meaning of imagined stimuli (904 of FIG. 9A; Supplementary Table 2).

For the decoder to transfer across tasks, the target task may share representations with the training task. The encoding model is trained to predict how a subject's brain would respond to perceived speech, so the explicit goal of the decoder is to generate words that would evoke the recorded brain responses when heard by the subject. The decoder successfully transfers to imagined speech because the semantic representations that are activated when the subject imagines a story are similar to the semantic representations that would have been activated had the subject heard the story. Nonetheless, decoding performance for imagined speech was lower than decoding performance for perceived speech (1502 of FIG. 15), which is consistent with previous findings that speech production and speech perception involve partially overlapping brain regions. A more precise decoding of imagined speech may be achieved by replacing the encoding model trained on perceived speech data with an encoding model trained on attempted or imagined speech data. This would give the decoder the explicit goal of generating words that would evoke the recorded brain responses when imagined by the subject.

2. Cross-Modal Decoding

Semantic representations are also shared between language perception and a range of other perceptual and conceptual processes, suggesting that unlike previous language decoders that used mainly motor or auditory signals, the language decoder may be able to reconstruct language descriptions from brain responses to non-linguistic tasks. To test this, subjects watched four short films without sound while being recorded with fMRI, and the recorded responses were decoded using the semantic language decoder. The decoded word sequences to language descriptions of the films for the visually impaired can be compared. The results show that they were significantly more similar than expected by chance (q(FDR)<0.05, one-sided nonparametric test; 1502 of FIG. 15). Qualitatively, the decoded sequences accurately described events from the films (906 of FIG. 9A). This suggests that a single semantic decoder trained during language perception could be used to decode a range of semantic tasks.

3. Attention Effects on Decoding

Since semantic representations are modulated by attention, the semantic decoder should selectively reconstruct attended stimuli. To test the effects of attention on decoding, subjects listened to two repeats of a multi-speaker stimulus that was constructed by temporally overlaying a pair of stories told by female and male speakers. On each presentation, subjects were cued to attend to a different speaker. Decoder predictions were significantly more similar to the attended story than to the unattended story (q(FDR)<0.05 across subjects, one-sided paired t-test), demonstrating that the decoder selectively reconstructs attended stimuli (908 of FIG. 9B; 1504 of FIG. 15). These results suggest that semantic decoders could perform well in complex environments with multiple sources of information. Moreover, these results demonstrate that subjects have conscious control over decoder output, and suggest that semantic decoders can only reconstruct what subjects are actively attending to.

4. Privacy Implications

An important ethical consideration for semantic decoding is its potential to compromise mental privacy. To test if decoders can be trained without a person's cooperation, perceived speech from each subject were decoded using decoders trained on data from other subjects. For this analysis, data from seven subjects were collected as they listened to five hours of narrative stories. These data were anatomically aligned across subjects using volumetric and surface-based methods. Decoders trained on cross-subject data (FIG. 16) performed barely above chance, and significantly worse than decoders trained on within-subject data (q(FDR)<0.05, two-sided t-test). This suggests that subject cooperation remains necessary for decoder training (910 of FIG. 9B; 1508 of FIG. 15).

To test if a decoder trained with a person's cooperation can later be consciously resisted, subjects silently performed three cognitive tasks—calculation ("count by sevens"), semantic memory ("name and imagine animals"), and imagined speech ("tell a different story")—while listening to segments from a narrative story. It is shown that performing the semantic memory and imagined speech tasks significantly lowered decoding performance relative to a passive listening baseline for each cortical region (q(FDR)<0.05 across subjects, one-sided paired t-test). This demonstrates that semantic decoding can be consciously resisted in an adversarial scenario, and that this resistance cannot be overcome by focusing the decoder only on specific brain regions (912 of FIG. 9B; 1508 of FIG. 15).

In FIG. 9A and FIG. 9B, several practical considerations of how the language decoder could be deployed as a brain-computer interface is shown. Results from imagining speech and watching short films are described and analyzed.

In 902, to test whether the language decoder can transfer to imagined speech, subjects imagined telling five 1-minute test stories twice. Single-trial brain responses were decoded and compared to reference transcripts that were separately recorded from the same subjects. Identification accuracy is shown for one subject. Each row corresponds to a scan, and the colors reflect the similarities between the decoder prediction and all five reference transcripts, normalized into probabilities. For each scan, the decoder prediction was most similar to the reference transcript of the correct story (100% identification accuracy).

In 904, reference transcripts are shown alongside decoder predictions for three imagined stories for one subject.

In 906, to test whether the language decoder can transfer to a different modality, subjects watched four silent short films. Single-trial brain responses were decoded using the language decoder. Decoder predictions were significantly related to the films (q(FDR)<0.05, one-sided nonparametric test), and often accurately described film events. Frames from two scenes are shown alongside decoder predictions for one subject.

In 908, to test whether the decoder is modulated by attention, subjects listened to a multi-speaker stimulus that overlays stories told by a female and a male speaker while attending to one or the other. Decoder predictions were significantly more similar to the attended story than to the unattended story (* indicates q(FDR)<0.05 across n=3 subjects, one-sided paired t-test; t(2)=6.15 for the female speaker, t(2)=6.45 for the male speaker). Markers indicate individual subjects.

In 910, to test whether decoding can succeed without training data from a particular subject, decoders were trained on brain responses from 5 sets of other subjects (indicated by markers) aligned using volumetric and surface-based methods. Cross-subject decoders performed barely above chance, and substantially worse than within-subject decoders (* indicates q(FDR)<0.05, two-sided t-test), suggesting that within-subject training data is critical.

In 912, to test whether decoding can be consciously resisted, subjects silently performed three resistance strategies: counting, naming animals, and telling a different story. Decoding performance under each condition was compared to a passive listening condition (* indicates q(FDR)<0.05 across n=3 subjects). Naming animals (t(2)=6.95 for the whole brain, t(2)=4.93 for the speech network, t(2)=6.93 for the association region, t(2)=4.70 for the prefrontal region) and telling a different story (t(2)=4.79 for the whole brain, t(2)=4.25 for the speech network, t(2)=3.75 for the association region, t(2)=5.73 for the prefrontal region) significantly lowered decoding performance in each cortical region, demonstrating that decoding can be resisted. Markers indicate individual subjects. Different experiments (perceived speech, imagined speech, perceived movie, multi-speaker, decoder resistance) cannot be compared based on story decoding scores because story decoding scores depend on the length of the stimuli 5. Sources of Decoding Error To identify potential avenues for improvement, decoding error during language perception reflects limitations of the fMRI recordings, the models, or both can be assessed (1002 of FIG. 10).

Figure 17:
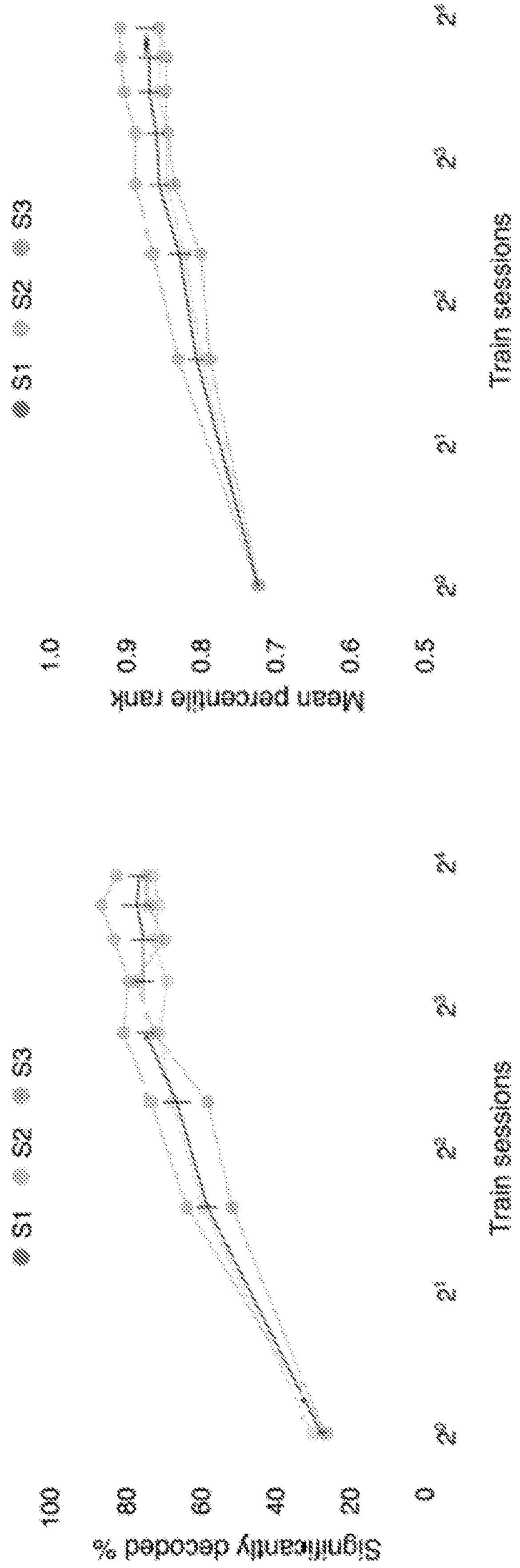
FIG. 17 provides analysis results of decoding performance as a function of training data.

BOLD fMRI recordings typically have a low signal-to-noise ratio (SNR). During model estimation, the effects of noise in the training data can be reduced by increasing the size of the dataset. To evaluate if decoding performance is limited by the size of the training dataset, the language decoders can be trained using different amounts of data. Decoding scores were significantly higher than expected by chance with just a single session of training data, but substantially more training data were required to consistently decode the different parts of the test story (FIG. 17). Decoding scores appeared to increase by an equal amount each time the size of the training dataset was doubled (1004 of FIG. 10). This suggests that training on more data will improve decoding performance, albeit with diminishing returns for each successive scanning session.

Low SNR in the test data may also limit the amount of information that can be decoded. To evaluate whether future improvements to single-trial fMRI SNR might improve decoding performance, the SNR can be artificially increased by averaging brain responses collected during different repeats of the test story. Decoding performance slightly increased with the number of averaged responses (1006 of FIG. 10), suggesting that some component of the decoding error reflects noise in the test data.

Another limitation of fMRI is that current scanners are too large and expensive for most practical decoder applications. Portable techniques like functional near-infrared spectroscopy (fNIRS) measure the same hemodynamic activity as fMRI, albeit at a lower spatial resolution. To test whether the decoder relies on the high spatial resolution of fMRI, the fMRI data can be smoothed out to the estimated spatial resolution of current fNIRS systems, and found that around 50% of the stimulus time-points could still be decoded (FIG. 18). This suggests that the decoding approach could eventually be adapted for portable systems.

Finally, to evaluate if decoding performance is limited by model misspecification—such as using suboptimal features to represent language stimuli—whether the decoding error follows systematic patterns can be tested. How well each individual word was decoded across six test stories (see Methods) can be scored, and the scores to behavioral word ratings and dataset statistics can be compared. If the decoding error were solely caused by noise in the test data, all words should be equally affected. However, it was found that decoding performance was significantly correlated with behavioral ratings of word concreteness (rank correlation ρ=0.15-0.28, q(FDR)<0.05), suggesting that the decoder is worse at recovering words with certain semantic properties (1008 of FIG. 10). Notably, decoding performance was not significantly correlated with word frequency in the training stimuli, suggesting that model misspecification is not primarily caused by noise in the training data (1010 of FIG. 10).

The results indicate that model misspecification is a major source of decoding error separate from random noise in the training and test data. Assessing how the different components of the decoder contribute to this misspecification, the decoder has been found to continually rely on the encoding model to achieve good performance (FIG. 19), and poorly decoded time-points tend to reflect errors in the encoding model (FIG. 20). Computational advances that reduce encoding model misspecification—such as the development of better semantic feature extractors—can be expected to substantially improve decoding performance.

FIG. 10 shows analysis results of decoding errors. Potential factors limiting decoding performance were tested to identify directions for improvements. Model bias and fMRI noise were considered and compared in FIG. 10 to come up with better predictions.

In 1002, three possible sources of decoding error are listed. The decoding error may be caused by misspecified features from the language model, insufficient data to train the encoding model, or noise from fMRI for measuring the brain activity.

In 1004, to test if decoding performance is limited by the size of the training dataset, decoders were trained on different amounts of data. Decoding scores appeared to increase by an equal amount each time the size of the training dataset was doubled.

In 1006, to test if decoding performance is limited by noise in the test data, the signal-to-noise ratio of the test responses was artificially raised by averaging across repeats of the test story. Decoding performance slightly increased with the number of averaged responses.

In 1008, to test if decoding performance is limited by model misspecification, word-level decoding scores were compared to behavioral ratings and dataset statistics (* indicates q(FDR)<0.05 for all subjects, two-sided permutation test). Markers indicate individual subjects.

In 1010, decoding performance was significantly correlated with word concreteness—suggesting that model misspecification contributes to decoding error—but not word frequency in the training stimuli—suggesting that model misspecification is not caused by noise in the training data. For all results, black lines indicate the mean across subjects and error bars indicate the standard error of the mean (n=3).

VI. SUPPLEMENTAL RESULTS

FIGS. 11-20 are extensions of experimental data shown in FIGS. 6-10.

FIG. 11 can show performances of two language decoder components that interface with fMRI data: the encoding model and the word rate model.

In 1102, encoding models were evaluated by predicting brain responses to the perceived speech test story and computing the linear correlation between the predicted responses and the actual single-trial responses. Correlations for subject S3 were projected onto a cortical flatmap. The encoding model successfully predicted brain responses in most cortical regions outside of primary sensory and motor areas.

In 1104, encoding models were trained on different amounts of data. To summarize encoding model performance across cortex, correlations were averaged across the 10,000 voxels used for decoding. Encoding model performance increased with the amount of training data collected from each subject.

In 1106, encoding models were tested on brain responses that were averaged across different repeats of the perceived speech test story to artificially increase the signal-to-noise ratio (SNR). Encoding model performance increased with the number of averaged responses.

In 1108, word rate models were trained on different amounts of data. Word rate models were evaluated by predicting the word rate of a test story and computing the linear correlation between the predicted and the actual word rate vectors. Word rate model performance slightly increased with the amount of training data collected from each subject.

In 1110, for brain responses to perceived speech, word rate models fit on auditory cortex significantly outperformed word rate models fit on prefrontal speech production areas or randomly sampled voxels (* indicates q(FDR)<0.05 across n=3 subjects, two-sided paired t-test).

In 1112, for brain responses to imagined speech, there were no significant differences in performance for word rate models fit on different cortical regions. For all results, black lines indicate the mean across subjects and error bars indicate the standard error of the mean (n=3).

Figure 12:
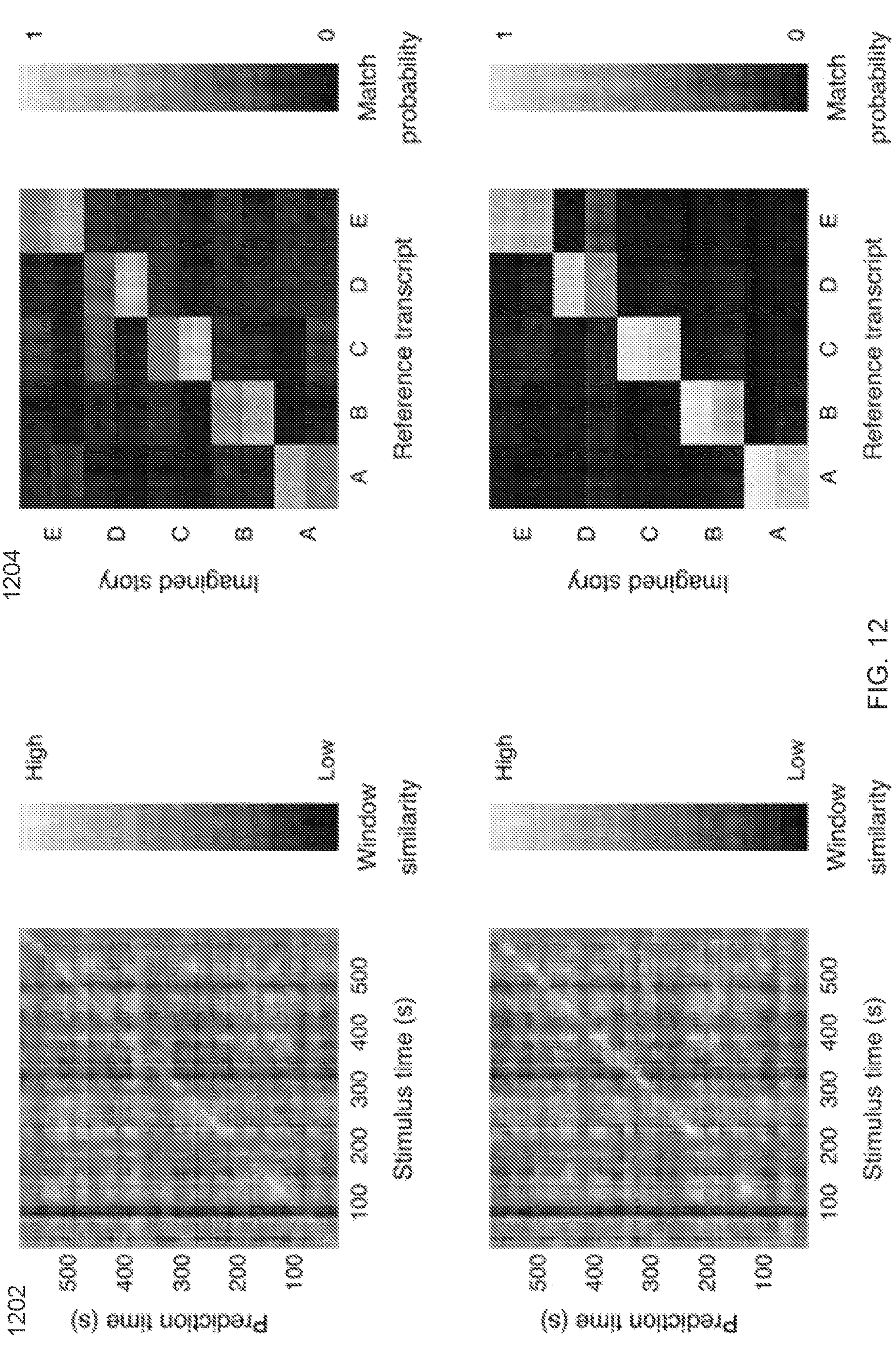
FIG. 12 provides analysis results of perceived and imagined speech identification performance.

FIG. 12 can show perceived and imagined speech identification performance. Language decoders were trained for subjects S1 and S2 on fMRI responses recorded while the subjects listened to narrative stories.

In 1202, the decoders were evaluated on single-trial fMRI responses recorded while the subjects listened to the perceived speech test story. The color at (i, j) reflects the BERTScore similarity between the ith second of the decoder prediction and the jth second of the actual stimulus. Identification accuracy was significantly higher than expected by chance (p<0.05, one-sided permutation test). Corresponding results for subject S3 are shown in 612 of FIG. 6B in the main text.

In 1204, the decoders were evaluated on single-trial fMRI responses recorded while the subjects imagined telling five 1-minute test stories twice. Decoder predictions were compared to reference transcripts that were separately recorded from the same subjects. Each row corresponds to a scan, and the colors reflect the similarities between the decoder prediction and all five reference transcripts, normalized into probabilities. For each scan, the decoder prediction was most similar to the reference transcript of the correct story (100% identification accuracy). Corresponding results for subject S3 are shown in 902 of FIG. 9A in the main text.

FIGS. 13A and 13B can show behavioral assessment of language decoder predictions. Four 80 s segments were chosen from the perceived speech test story. For each segment, four multiple-choice questions were written based on the actual stimulus words without looking at the decoder predictions. 100 subjects were recruited for an online behavioral experiment and randomly assigned to experimental and control groups. For each segment, the experimental group subjects answered the questions after reading the decoded words from subject S3, while the control group subjects answered the questions after reading the actual stimulus words.

In 1302, experimental group scores were significantly higher than expected by chance for 9 out of the 16 questions (* indicates q(FDR)<0.05, two-sided binomial test).

In 1304, the decoded words and the actual stimulus words for a segment.

In 1308, the multiple-choice questions cover different aspects of the stimulus story.

Figure 14:
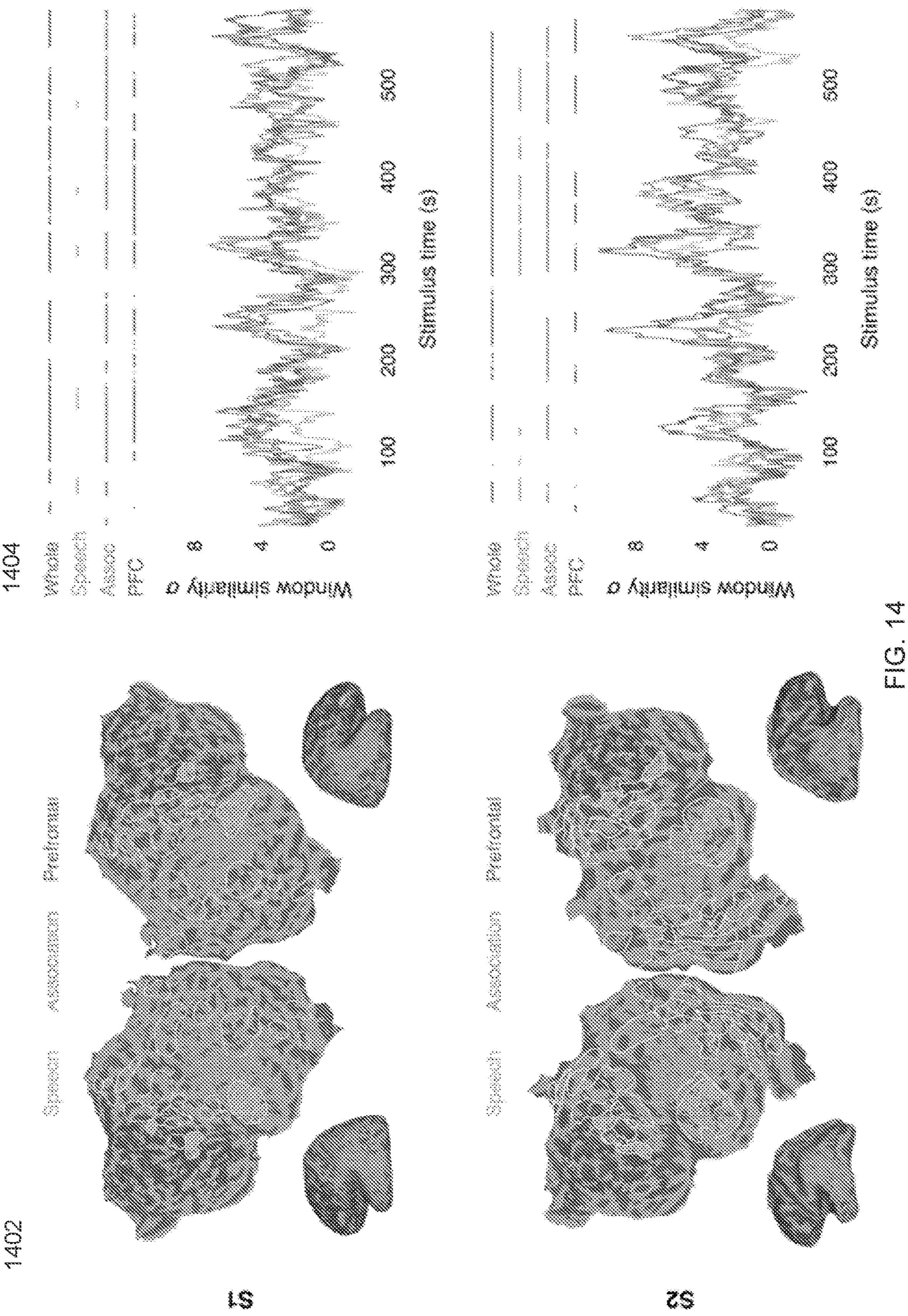
FIG. 14 provides analysis results of language decoding across cortical regions.

FIG. 14 can show decoding performance across cortical regions.

In 1402, cortical regions for subjects S1 and S2. Brain data used for decoding (colored regions) were partitioned into the speech network, the parietal-temporal-occipital association region, and the prefrontal region (PFC).

In 1404, decoding performance time-course for the perceived speech test story from each region. Horizontal lines indicate when decoder predictions were significantly more similar to the actual stimulus words than expected by chance under the BERTScore metric (q(FDR)<0.05, one-sided nonparametric test). Corresponding results for subject S3 are shown in 802 and 804 of FIG. 8A in the main text.

Figure 15:
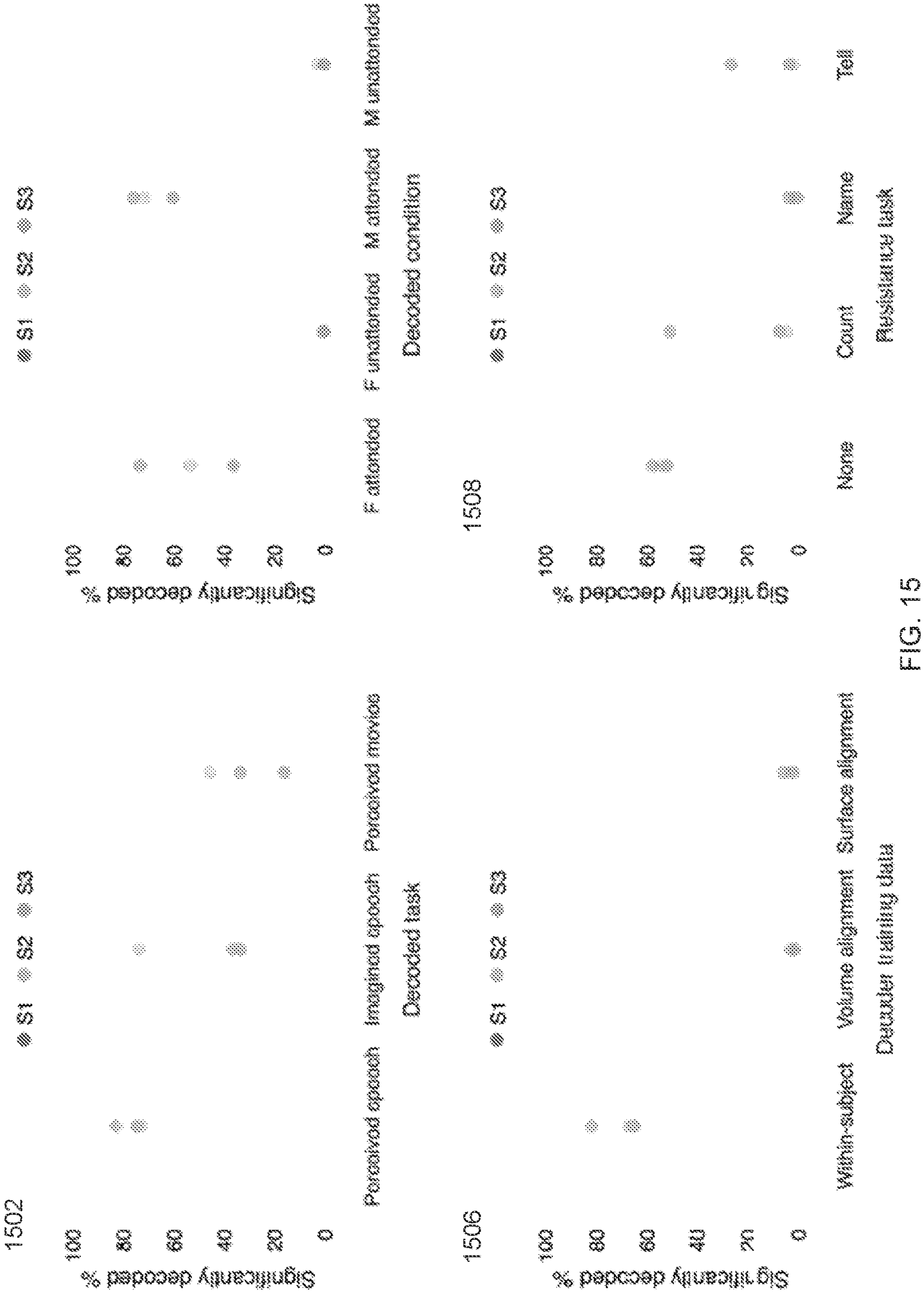
FIG. 15 provides analysis results of comparison of language decoding performance across different experiments.

FIG. 15 can show comparison of decoding performance across experiments. Decoder predictions from different experiments were compared based on the fraction of significantly decoded time-points under the BERTScore metric (q(FDR)<0.05). The fraction of significantly decoded time-points was used because it does not depend on the length of the stimuli.

In 1502, The decoder successfully recovered 72-82% of time-points during perceived speech, 33-73% of time-points during imagined speech, and 16-45% of time-points during perceived movies.

In 1504, During a multi-speaker stimulus, the decoder successfully recovered 36-73% of time-points told by the female speaker when subjects attended to the female speaker, 0-1% of time-points told by the female speaker when subjects attended to the male speaker, 60-76% of time-points told by the male speaker when subjects attended to the male speaker, and 0-3% of time-points told by the male speaker when subjects attended to the female speaker.

In 1506, During a perceived story, within-subject decoders successfully recovered 65-82% of time-points, volumetric cross-subject decoders successfully recovered 1-2% of time-points, and surface-based cross-subject decoders successfully recovered 1-5% of time-points.

In 1508, During a perceived story, within-subject decoders successfully recovered 52-57% of time-points when subjects passively listened, 4-50% of time-points when subjects resisted by counting by sevens, 0-3% of time-points when subjects resisted by naming animals, and 1-26% of time-points when subjects resisted by imagining a different story.

Figure 16:
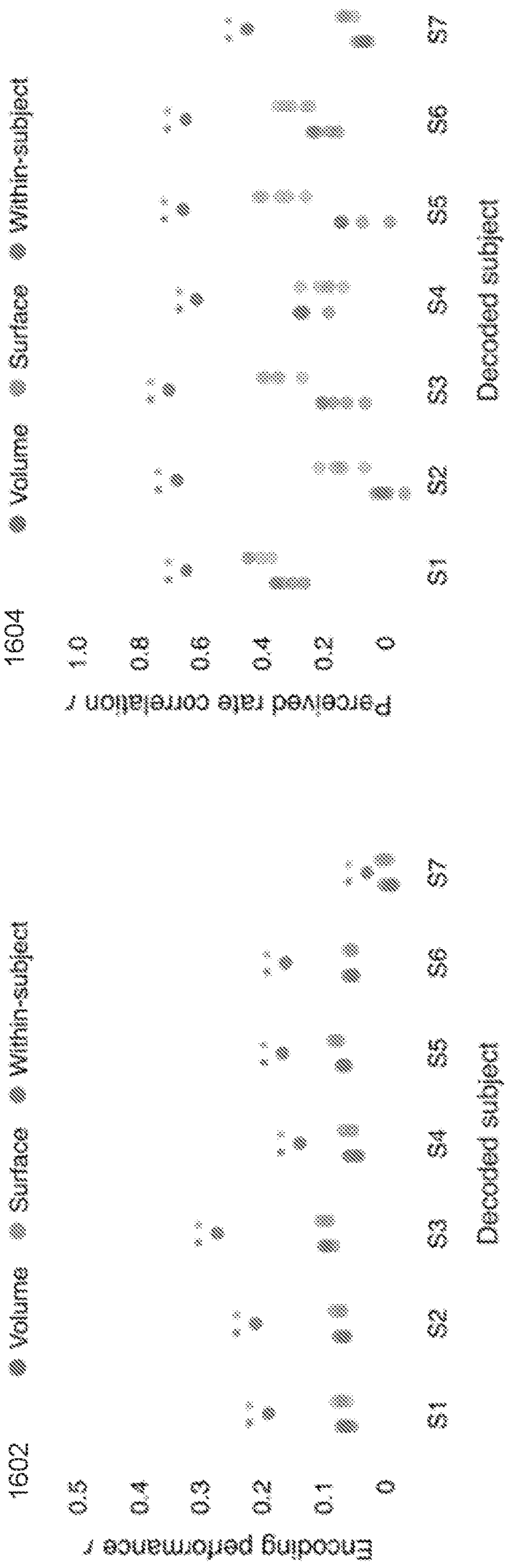
FIG. 16 provides analysis results of cross-subject encoding model and word-time decoder performance.

FIG. 16 can show cross-subject encoding model and word rate model performance. For each subject, encoding models and word rate models were trained on brain responses from 5 sets of other subjects (indicated by markers) aligned using volumetric and surface-based methods. The models were evaluated on within-subject single-trial responses to the perceived speech test story.

In 1602, Cross-subject encoding models performed significantly worse than within-subject encoding models (* indicates (q(FDR)<0.05, two-sided t-test).

In 1604, Cross-subject word rate models performed significantly worse than within-subject word rate models (* indicates (q(FDR)<0.05, two-sided t-test).

FIG. 17 can show Decoding performance as a function of training data. Decoders were trained on different amounts of data and evaluated on the perceived speech test story.

In 1702, the fraction of significantly decoded time-points increased with the amount of training data collected from each subject but plateaued after 7 scanning sessions (7.5 h) and did not substantially increase up to 15 sessions (16 h). The substantial increase up to 7 scanning sessions suggests that decoders can recover certain semantic concepts after training on a small amount of data, but require much more training data to achieve consistently good performance across the test story.

In 1704, the mean identification percentile rank increased with the amount of training data collected from each subject but plateaued after 7 scanning sessions (7.5 h) and did not substantially increase up to 15 sessions (16 h). For all results, black lines indicate the mean across subjects and error bars indicate the standard error of the mean (n=3).

FIG. 18 can show Decoding performance at lower spatial resolutions. While fMRI provides high spatial resolution, current MRI scanners are too large and expensive for most practical decoder applications. Portable alternatives like functional near-infrared spectroscopy (fNIRS) measure the same hemodynamic activity as fMRI, albeit at a lower spatial resolution. To simulate how the decoder would perform at lower spatial resolutions, fMRI data were spatially smoothed using Gaussian kernels with standard deviations of 1, 2, 3, 4, and 5 voxels, corresponding to 6.1, 12.2, 18.4, 24.5, and 30.6 mm full width at half maximum (FWHM). The encoding model, noise model, and word rate model were estimated on spatially smoothed training data, and the decoder was evaluated on spatially smoothed responses to the perceived speech test story.

In 1802, fMRI images for each subject were spatially smoothed using progressively larger Gaussian kernels.

In 1804, story similarity decreased as the data were spatially smoothed, but remained high at moderate levels of smoothing.

In 1806, The fraction of significantly decoded time-points decreased as the data were spatially smoothed, but remained high at moderate levels of smoothing.

In 1808, encoding model prediction performance increased as the data were spatially smoothed, demonstrating that decoding performance and encoding model performance are not perfectly coupled. While spatial smoothing reduces information, making it harder to decode the stimulus, it also reduces noise, making it easier to predict the responses. For all results, black lines indicate the mean across subjects and error bars indicate the standard error of the mean (n=3). Dashed gray lines indicate the estimated spatial resolution of current portable systems. These results show that around 50% of the stimulus time-points could still be decoded at the estimated spatial resolution of current portable systems, and provide a benchmark for how much portable systems need to improve to reach different levels of decoding performance.

FIG. 19 can show Decoder ablations. To decode new words, the decoder uses both the autoregressive context (i.e. the previously decoded words) and the fMRI data. To understand the relative contributions of the autoregressive context and the fMRI data, decoders were evaluated in the absence of each component. The standard decoding approach was performed up to a cutoff point in the perceived speech test story. After the cutoff, either the autoregressive context was reset or the fMRI data were removed. To reset the autoregressive context, all of the candidate sequences were discarded and the beam was re-initialized with an empty sequence. The standard decoding approach was then performed for the remainder of the scan. To remove the fMRI data, continuations were assigned random likelihoods rather than encoding model likelihoods for the remainder of the scan.

In 1902, A cutoff point was defined 300 s into the stimulus for one subject. When the autoregressive context was reset, decoding performance fell but quickly rebounded. When the fMRI data were removed, decoding performance quickly fell to chance level. The gray shaded region indicates the 5th to 95th percentiles of the null distribution.

In 1904, The ablations were repeated for cutoff points at every 50 s of the stimulus. The performance differences between the original decoder and the ablated decoders were averaged across cutoff points and subjects, yielding profiles of how decoding performance changes after each component is ablated. The blue and purple shaded regions indicate the standard error of the mean (n=27 trials). These results demonstrate that the decoder continually relies on the encoding model and the fMRI data to achieve good performance, and does not require good initial context. In these figures, each time-point was scored based on the 20 s window ending at that time-point, whereas in all other figures, each time-point was scored based on the 20 s window centered around that time-point. This shifted indexing scheme emphasizes how decoding performance changes after a cutoff. Dashed gray lines indicate cutoff points FIG. 20 can show Isolated encoding model and language model scores. The encoding model and the language model were separately evaluated on the perceived speech test story to isolate their contributions to the decoding error. At each word time t, the encoding model and the language model were provided with the actual stimulus word as well as 100 randomly sampled distractor words. The encoding model ranks the words based on the likelihood of the recorded fMRI responses, and the language model ranks the words based on their probability given the previous stimulus words. Isolated encoding model and language model scores were computed based on the number of distractor words ranked below the actual word. A score of 100 indicates perfect performance and a score of 50 indicates chance level performance. To compare against the full decoding scores from 610 of FIG. 1 the word-level encoding model and language model scores were averaged across 20 s windows of the stimulus.

In 2002, encoding model scores were significantly correlated with the full decoding scores (linear correlation r=0.22-0.58, p<0.05), suggesting that many of the poorly decoded time-points in 610 of FIG. 6B are inherently more difficult to decode using the encoding model.

In 2004, language model scores were not significantly correlated with the full decoding scores.

In 2006, For each word, a two-sided t-test was used to compare encoding model scores from 10 sets of randomly sampled distractors to the chance level of 50. Most stimulus words with statistically significant encoding model scores ((q(FDR)<0.05, two-sided t-test) for the whole brain also had statistically significant encoding model scores for the speech network (80-87%), association region (88-92%), and prefrontal region (82-85%), suggesting that the results in 806 of FIG. 8A were not primarily due to the language model. Word-level encoding model scores were significantly correlated across each pair of regions ((q(FDR)<0.05, two-sided permutation test), suggesting that the results in 808 of FIG. 8A were not primarily due to the language model.

In 2008, To characterize biases in the decoder components, word-level encoding model and language model scores were correlated against the word properties tested in 1008 of FIG. 10 (* indicates (q(FDR)<0.05 for all subjects, two-sided permutation test). The encoding model and the language model were biased in opposite directions for several word properties. These effects may have balanced out in the full decoder, leading to the observed lack of correlation between the word properties and the full decoding scores (1008 of FIG. 10).

VII. COMPUTER SYSTEM

Figure 21:
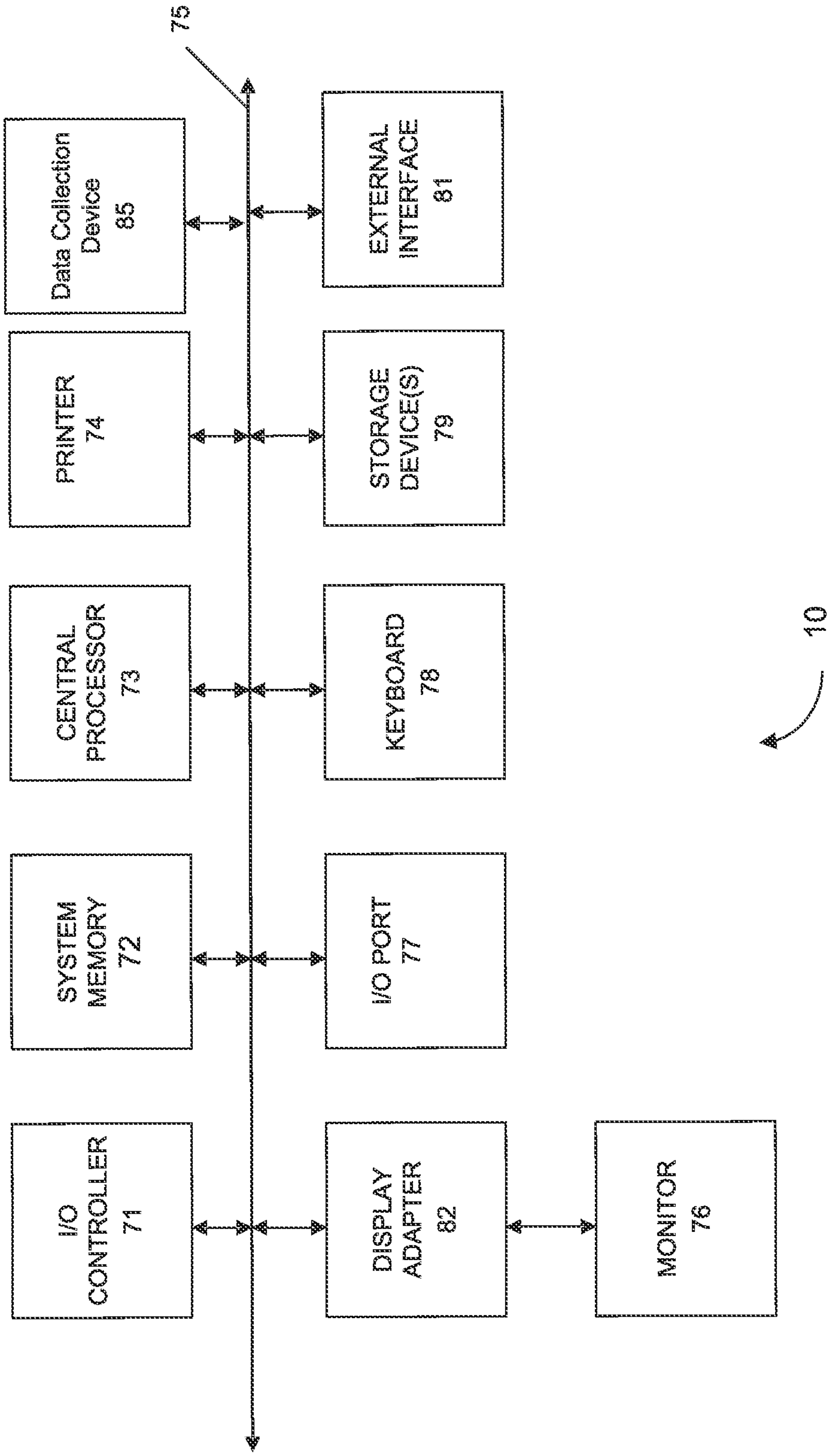
FIG. 21 shows a block diagram of an example computer system usable with systems and methods according to embodiments of the present disclosure

Any of the computer systems mentioned herein may utilize any suitable number of subsystems. Examples of such subsystems are shown in FIG. 21 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 21 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on." When a Markush group or other grouping is used herein, all individual members of the group and all combinations and subcombinations possible of the group are intended to be individually included in the disclosure.

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method comprising performing by a computer system:

(a) receiving N hypotheses, each hypothesis including a same number of words;

(b) predicting, by a language model, a set of K continuation words for each hypothesis;

(c) combining each hypothesis with a corresponding set of K continuation words to obtain N*K continuations;

(d) converting, by an encoding model, each continuation into a predicted brain response of L candidate response values, where each candidate response value corresponds to a measurement of a different part of the brain or to a different sensor;

(e) receiving a brain activity measurement comprising L brain measurements of a subject for a current time period;

(f) comparing the brain activity measurement comprising the L brain measurements to the predicted brain response of L candidate response values of each of the N*K continuation to obtain N*K scores;

(g) identifying a top N continuation based on the N*K scores;

(h) repeating (a)-(g); and (i) outputting, based on the top N continuations, a series of words corresponding to the brain activity measurement of the subject.

2. The method of claim 1, wherein the brain activity measurement is obtained using a functional magnetic resonance imaging (fMRI), and the current time period for fMRI is between 1 to 5 seconds.

3. The method of claim 1, wherein the brain activity measurement is obtained using a functional near-infrared spectroscopy (fNIRS), and the current time period for fNIRS is between 1 to 5 seconds.

4. The method of claim 1, wherein the brain activity measurement of the subject is measured by a brain imaging device of the computer system when the subject receives stimulus.

5. The method of claim 4, wherein the subject receives the stimulus by thinking, reading, or listening to the stimulus.

6. The method of claim 1, wherein the brain activity measurement is pre-recorded.

7. The method of claim 1, wherein the N hypotheses have default values that are customizable based on different use cases.

8. The method of claim 1, wherein each continuation is composed of sequences of words, where each sequence of words correlates to a number of words perceived by the subject in an acquisition time.

9. The method of claim 8, wherein the number of words perceived by the subject in the acquisition time is predicted using a word-time decoder.

10. The method of claim 8, wherein the converting each continuation into a predicted brain response of L candidate response values comprises:

transforming the continuation into a set of word embeddings vectors, wherein each word embeddings vector of the set of word embedding vectors correlates to each word in the sequences of words;

downsampling the set of word embedding vectors to produce an averaged word embedding vector;

applying a convolution kernel to the averaged word embedding vector and previous averaged word embedding vectors to produce a final word embedding vector; and transforming features of the final word embedding vector into the predicted brain response of L candidate response values.

11. The method of claim 1, wherein the L brain measurements are L voxel measurements comprising responses from L different voxels of a brain, each voxel eliciting a different measurement.

12. The method of claim 10, wherein the encoding model has a dimension of J×L, where J represents a number of features in the final word embedding vector and L represents a number of candidate response values.

13. The method of claim 10, wherein the convolution kernel comprises different weights, wherein each weight is determined based on degrees of influence the averaged word embedding vector and the previous averaged word embedding vectors have on the brain activity measurement of the subject for the current time period.

14. A method comprising performing by a computer system:

(a) annotating each word in a sequence of words with time labels, wherein the sequence of words is associated with one acquisition time;

(b) transforming, by a neural language model, the sequence of words into a set of word embedding vectors, wherein each word in the sequence of words corresponds to a word embedding vector;

(c) determining a final word embedding vector using the set of word embedding vectors;

(d) receiving a brain activity measurement comprising L brain measurements of a subject; and (e) determining a linear mapping of the final word embedding vector into a voxel space of the brain activity measurement comprising L brain measurements to determine an encoding model.

15. The method of claim 14, wherein the annotating the sequence of words with the time labels is done by a speech recognition software or a human annotator.

16. The method of claim 14, further comprising:

determining a word-time decoder that can predict a number of words in one acquisition time by mapping between the brain activity measurement and a vector of word rates in the sequence of words.

17. The method of claim 14, wherein each word embedding vector of the word represents a semantic and/or a syntax of the word.

18. The method of claim 14, wherein the determining the final word embedding vector using the set of word embedding vectors comprise:

downsampling the set of word embedding vectors to produce an averaged word embedding vector; and applying a convolution kernel to the averaged word embedding vector and previous averaged word embedding vectors to produce the final word embedding vector.

19. A computer product comprising a non-transitory computer readable medium storing a plurality of instructions that, when executed, control a computer system to perform a method comprising:

(a) receiving N hypotheses, each hypothesis including a same number of words;

(b) predicting, by a language model, a set of K continuation words for each hypothesis;

(c) combining each hypothesis with a corresponding set of K continuation words to obtain N*K continuations;

(d) converting, by an encoding model, each continuation into a predicted brain response of L candidate response values, where each candidate response value corresponds to a measurement of a different part of the brain or to a different sensor;

(e) receiving a brain activity measurement comprising L brain measurements of a subject for a current time period;

(f) comparing the brain activity measurement comprising the L brain measurements to the predicted brain response of L candidate response values of each of the N*K continuation to obtain N*K scores;

(g) identifying a top N continuation based on the N*K scores;

(h) repeating (a)-(g); and (i) outputting, based on the top N continuations, a series of words corresponding to the brain activity measurement of the subject.

* * * * *